(12) United States Patent
Hwang et al.

(10) Patent No.: US 10,965,510 B2
(45) Date of Patent: *Mar. 30, 2021

(54) METHOD FOR RECEIVING NRS AND NB-IOT DEVICE THEREOF

(71) Applicant: LG ELECTRONICS INC., Seoul (KR)

(72) Inventors: Seunggye Hwang, Seoul (KR); Joonkui Ahn, Seoul (KR); Changhwan Park, Seoul (KR); Suckchel Yang, Seoul (KR); Seokmin Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,551

(22) Filed: Aug. 8, 2019

(65) Prior Publication Data
US 2019/0363920 A1 Nov. 28, 2019
US 2020/0322200 A9 Oct. 8, 2020

Related U.S. Application Data

(63) Continuation of application No. 16/249,569, filed on Jan. 16, 2019, now Pat. No. 10,425,265, which is a (Continued)

(30) Foreign Application Priority Data

Apr. 3, 2018 (KR) ........................ 10-2018-0038747

(51) Int. Cl.
*H04L 27/26* (2006.01)
*H04W 4/70* (2018.01)
(Continued)

(52) U.S. Cl.
CPC ............ *H04L 27/2613* (2013.01); *H04L 1/00* (2013.01); *H04L 5/005* (2013.01); *H04L 5/0007* (2013.01);
(Continued)

(58) Field of Classification Search
CPC . H04L 12/4612; H04L 27/2613; H04L 12/52; H04L 5/22
See application file for complete search history.

(56) References Cited

U.S. PATENT DOCUMENTS

2016/0338049 A1  11/2016  Takeda et al.
2017/0142702 A1   5/2017  Yu et al.
(Continued)

FOREIGN PATENT DOCUMENTS

JP   2017513289    5/2017
KR   20170012150   2/2017
(Continued)

OTHER PUBLICATIONS

Ericsson, "On NB-IoT UE measurements on anchor carriers," R1-1701896, 3GPP TSG RAN#88, Athens, Greece, Feb. 13-17, 2017, 6 pages.
(Continued)

*Primary Examiner* — Ashley Shivers
(74) *Attorney, Agent, or Firm* — Fish & Richardson P.C.

(57) ABSTRACT

One disclosure of the present specification proposes a method for receiving a Narrowband Reference Signal (NRS) by a Narrow band Internet of Things (NB-IoT) device. The method may comprise receiving the NRS on at least one or more orthogonal frequency division multiplexing (OFDM) symbols. The one or more OFDM symbols are in a time division duplex (TDD) subframe. If the TDD subframe corresponds to a TDD special subframe, the one or more OFDM symbols for receiving the NRS is determined based on which TDD special subframe configuration index among a plurality of TDD special configuration indexes is used by the TDD special subframe.

19 Claims, 17 Drawing Sheets

Related U.S. Application Data continuation of application No. PCT/KR2018/007770, filed on Jul. 10, 2018.

(60) Provisional application No. 62/531,363, filed on Jul. 12, 2017, provisional application No. 62/674,562, filed on May 21, 2018.

(51) Int. Cl.

| | | |
|---|---|---|
| *H04L 5/00* | (2006.01) | |
| *H04L 1/00* | (2006.01) | |
| *H04L 5/14* | (2006.01) | |
| *H04L 5/22* | (2006.01) | |
| *H04L 12/46* | (2006.01) | |

(52) U.S. Cl.
CPC ............ *H04L 5/143* (2013.01); *H04L 5/1469* (2013.01); *H04L 5/22* (2013.01); *H04L 12/4612* (2013.01); *H04L 27/2602* (2013.01); *H04W 4/70* (2018.02)

(56) References Cited

U.S. PATENT DOCUMENTS

| | | |
|---|---|---|
| 2017/0201362 A1 | 7/2017 | Park et al. |
| 2017/0265225 A1 | 9/2017 | Takeda et al. |
| 2018/0316464 A1 | 11/2018 | Stern-Berkowitz et al. |
| 2019/0124699 A1 | 4/2019 | Yamada et al. |
| 2020/0266956 A1* | 8/2020 | Chen .................... H04L 5/0007 |

FOREIGN PATENT DOCUMENTS

| | | |
|---|---|---|
| KR | 20170012153 | 2/2017 |
| WO | WO2017043801 | 3/2017 |
| WO | WO2017057870 | 4/2017 |
| WO | WO2018/152029 | 8/2018 |

OTHER PUBLICATIONS

3GPP, "3GPP TS 36.211 V14.2.0," Mar. 2017, 50 pages.
EP Office Action in European Application No. EP18826911, dated Jan. 28, 2020, 11 pages.
Nokia Networks, "On the synchronization signal design for NB-IoT", R1-157274, 3GPP TSG-RAN WG1 Meeting #83, Anaheim, USA, Nov. 15-22, 2015, 9 pages.
Nokia, Alcatel-Lucent Shanghai Bell, "Slot-level FS2 aspects for sTTI", R1-1708837, 3GPP TSG-RAN WG1 Meeting #89, Hangzhou, P.R. China, May 15-19, 2017, 5 pages.
Nokia Networks, "Synchronization signal design for NB-IoT," R1-160012, 3GPP TSG-RAN WG1 NB-IoT Adhoc, Budapest, Hungary, Jan. 18-20, 2016, 7 pages.
WI rapporteur (Ericsson), "RAN1 agreements for Rel-13 NB-IoT," R1-165977, 3GPP TSG-RAN WG1 Meeting #85, Nanjing, China, May 22-26, 2016, 33 pages.
Japanese Office Action in Japanese Appln. No. 2019-512989, dated Jun. 16, 2020, 7 pages (with English translation).
Nokia Networks, "On the TDD support for NB-IoT," R1-160011, 3GPP TSG-RAN WG1 NB-IoT AdHoc, Budapest, Hungary, Jan. 18-20, 2016, 3 pages.
Panasonic, Huawei, HiSilicon, NEC, MediaTek, "Correction of NB-IoT antenna port mapping," R1-167435, 3GPP TSG-RAN WG1 Meeting #86, Gothenburg, Sweden Aug. 22-26, 2016, 5 pages.

* cited by examiner

FIG. 10
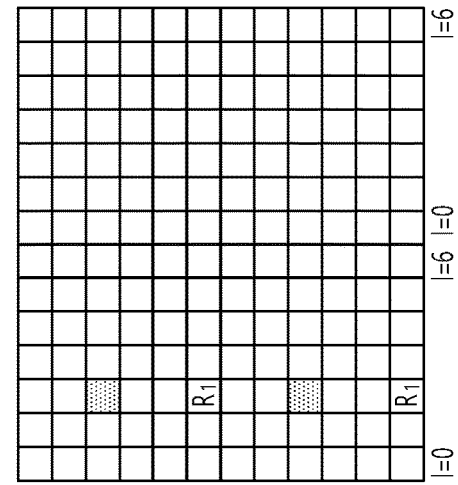
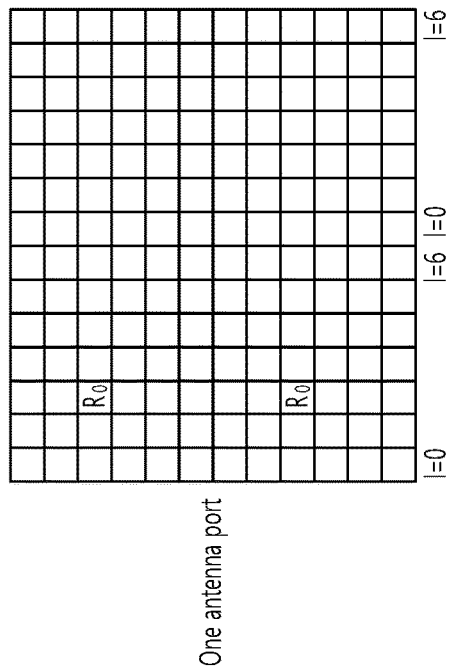
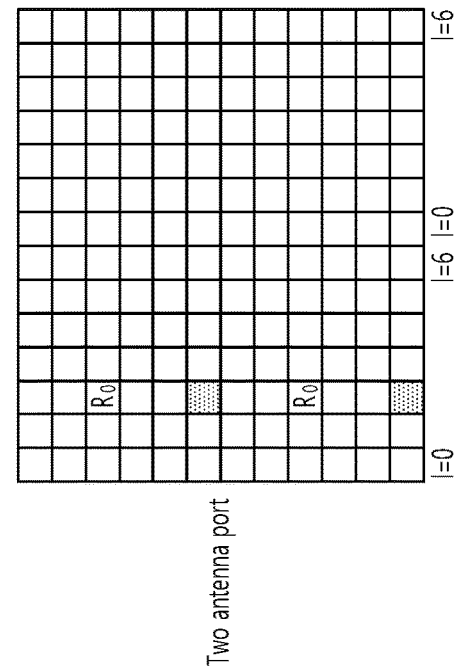

METHOD FOR RECEIVING NRS AND NB-IOT DEVICE THEREOF

CROSS-REFERENCE TO RELATED APPLICATIONS

This application is a continuation of U.S. application Ser. No. 16/249,569, filed on Jan. 16, 2019, which is a continuation of International Application No. PCT/KR2018/007770, filed on Jul. 10, 2018, which claims the benefit of U.S. Provisional Applications No. 62/531,363 filed on Jul. 12, 2017, No. 62/674,562 filed on May 21, 2018, and Korean Patent Application No. 10-2018-0038747 filed on Apr. 3, 2018, the contents of which are all hereby incorporated by reference herein in their entirety.

BACKGROUND OF THE INVENTION

Field of the Invention

The present invention relates to mobile communication.

Related Art

In recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user. Meanwhile, since the existing LTE system has been designed for the purpose of supporting high-speed data communication, it has been regarded as an expensive communication method. However, the MTC may be widely used only when a price is low according to a characteristic thereof. Therefore, a method of reducing a bandwidth for MTC to be smaller than a system bandwidth has been examined for cost reduction.

Also, the MTC is recently getting attention as a means to implement Internet of Things (IoT).

As one solution to provide IoT devices at low cost, an operation scheme for IoT devices is under consideration, which makes an IoT device operate with bandwidth more reduced than the system bandwidth of a cell.

As described above, IoT communication operating with reduced bandwidth is called Narrow Band (NB)-IoT communication.

To improve channel estimation and decoding performance of an NB-IoT device, Narrowband Reference Signal (NRS) has been proposed.

However, up to now, research has been conducted only into transmission of the NRS from frequency division duplex (FDD)-based subframes, and research into a method for transmitting the NRS on a time division duplex-based subframe has not been conducted yet.

SUMMARY OF THE INVENTION

Accordingly, a disclosure of the present specification has been made in an effort to solve the aforementioned problem.

To achieve the aforementioned purpose, a disclosure of the present specification provides a method for receiving a narrowband reference signal (NRS). The method may be performed by a narrowband internet of things (NB-IoT) device and comprise: receiving the NRS on at least one or more orthogonal frequency division multiplexing (OFDM) symbols. The one or more OFDM symbols may be in a time division duplex (TDD) subframe. If the TDD subframe corresponds to a TDD special subframe, the one or more OFDM symbols for receiving the NRS may be determined based on which a TDD special subframe configuration index, among a plurality of TDD special subframe configuration indexes, the TDD special subframe uses.

The TDD special subframe including the one or more OFDM symbols for receiving the NRS may use at least one of TDD special configuration indexes 1, 2, 3, 4, 6, 7, 8 and 9.

The one or more OFDM symbols for receiving the NRS may include at least one of 6th and 7th symbols in the TDD special subframe.

The NRS may not be received on at least one TDD special subframe using TDD special configuration indexes 0 and 5.

The one or more OFDM symbols for receiving the NRS may include at least one of 2nd and 3rd symbols in the TDD special subframe.

The NRS on the TDD special subframe may be generated based on a normal downlink subframe.

The method may comprise: receiving a second reference signal (RS) in a TDD special subframe using a TDD special subframe configuration index 10.

The second RS may include a cell-specific reference signal (CRS) if a NB-IoT operation mode is an inband-samePCI mode representing an inband same physical cell identifier (PCI).

If the NB-IoT operation mode is the inband-samePCI representing the inband same PCI, a location of a resource element (RE) to which the NRS is mapped may be different from a location of a RE to which the CRS is mapped.

The second RS may include an NRS if a NB-IoT operation mode is an inband-differentPCI mode representing an inband different PCI.

If the NB-IoT operation mode is the inband-differentPCI representing the inband different PCI, an RE to which the CRS is to be mapped may be used as a blank RE.

The special subframe using the TDD special subframe configuration index 10 may be designated as a valid subframe.

The special subframe using the TDD special subframe configuration index 10 may include a downlink pilot time slot (DwPTS) in which a downlink data is to be received.

The TDD special subframe in which the NRS is received may be a valid subframe in which a downlink data is to be received.

To achieve the aforementioned purpose, a disclosure of the present specification provides a narrowband internet of things (NB-IoT) device for receiving a narrowband reference signal (NRS). The NB-IoT device may comprise: a transceiver; and a processor configured to receive, via the transceiver, the NRS on at least one or more orthogonal frequency division multiplexing (OFDM) symbols. The one or more OFDM symbols may be in a time division duplex (TDD) subframe. If the TDD subframe corresponds to a TDD special subframe, the one or more OFDM symbols for receiving the NRS may be determined based on which a TDD special subframe configuration index, among a plurality of TDD special subframe configuration indexes, the TDD special subframe uses.

According to the disclosure of the present invention, the problem of the conventional technology described above may be solved.

BRIEF DESCRIPTION OF THE DRAWINGS

FIG. 10 illustrates the position of an RE to which an NRS is mapped according to a method of I-1-3.

DESCRIPTION OF EXEMPLARY EMBODIMENTS

Figure 1:
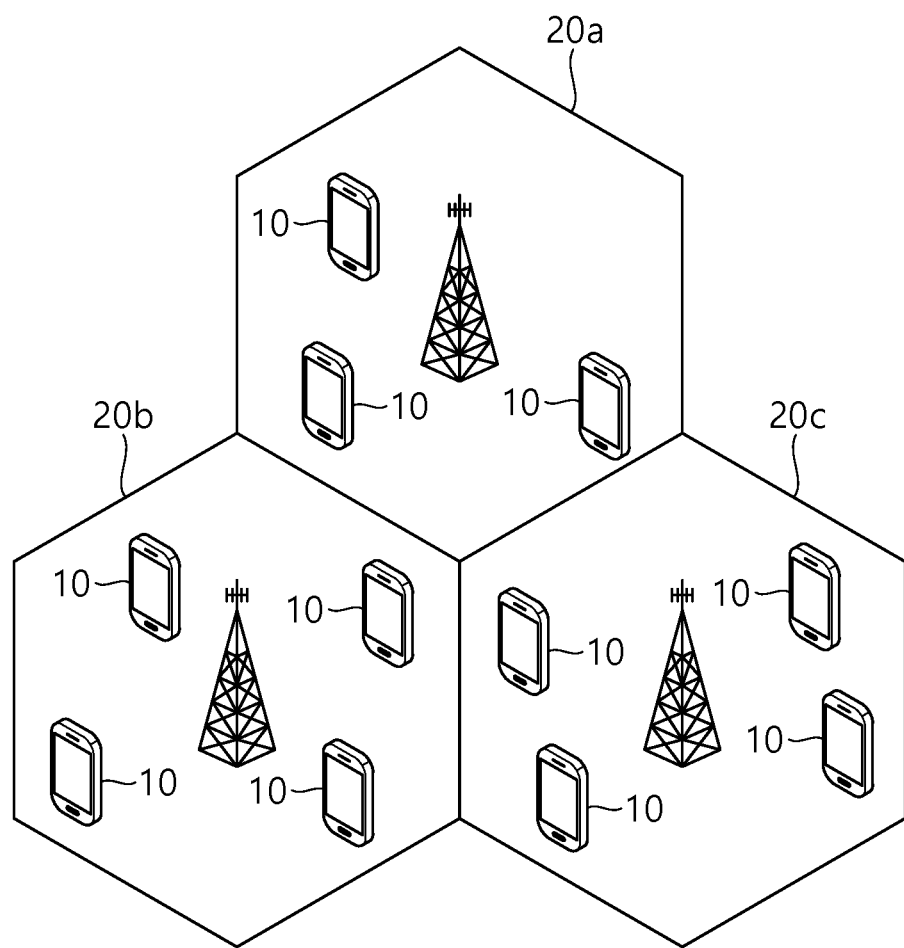
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. Abase station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
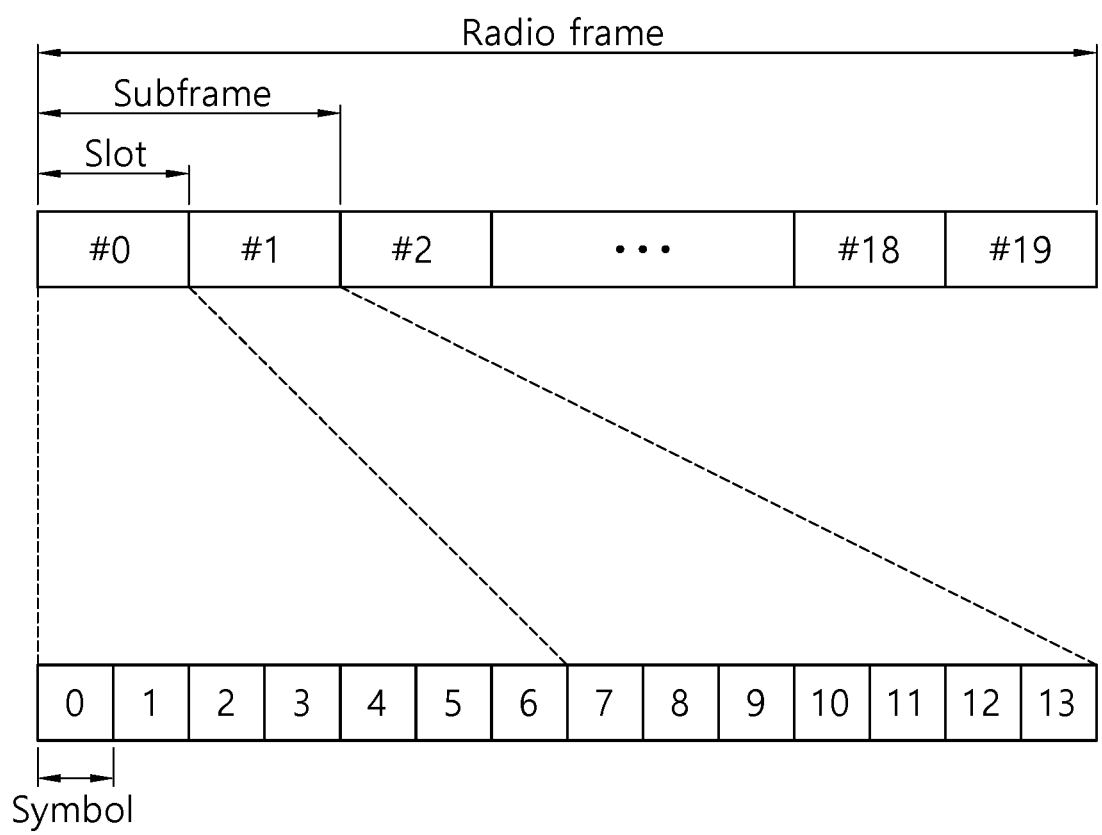
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
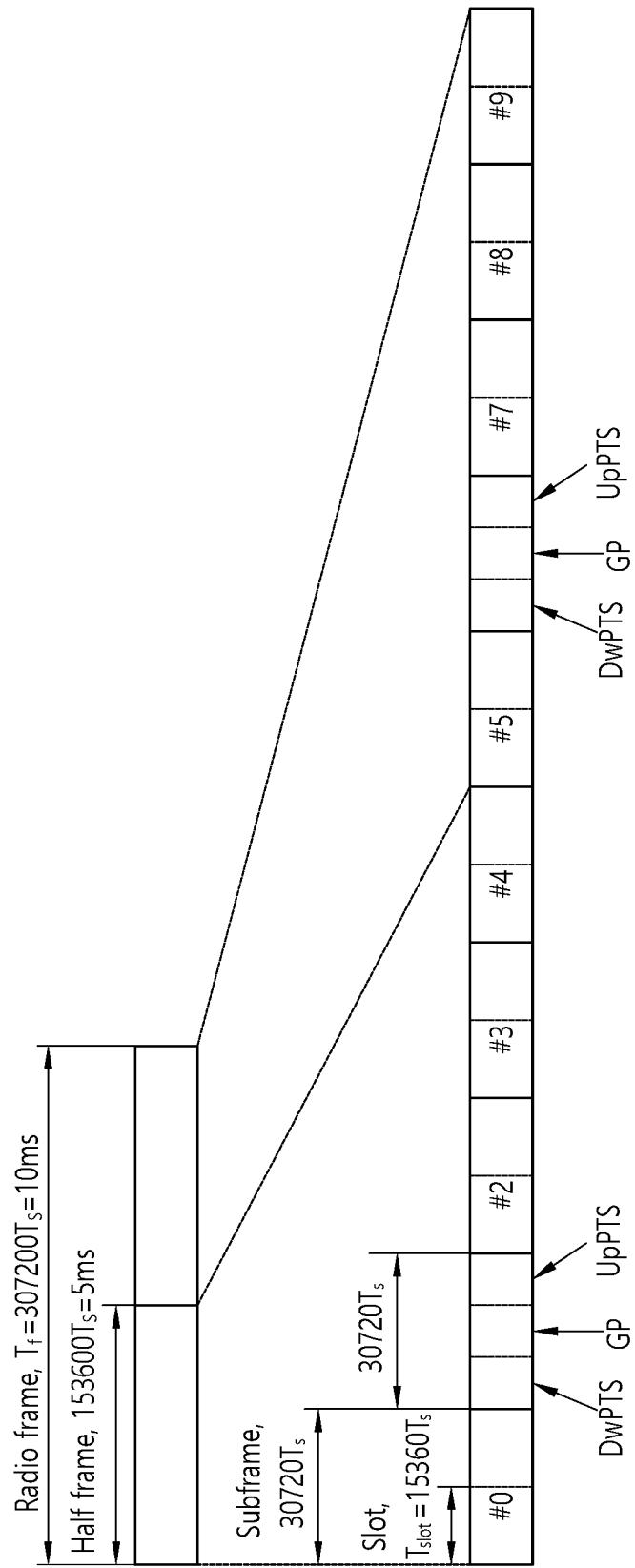
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS(Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additonal radio resouce.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

In what follows, IoT will be described.

Figure 4A:
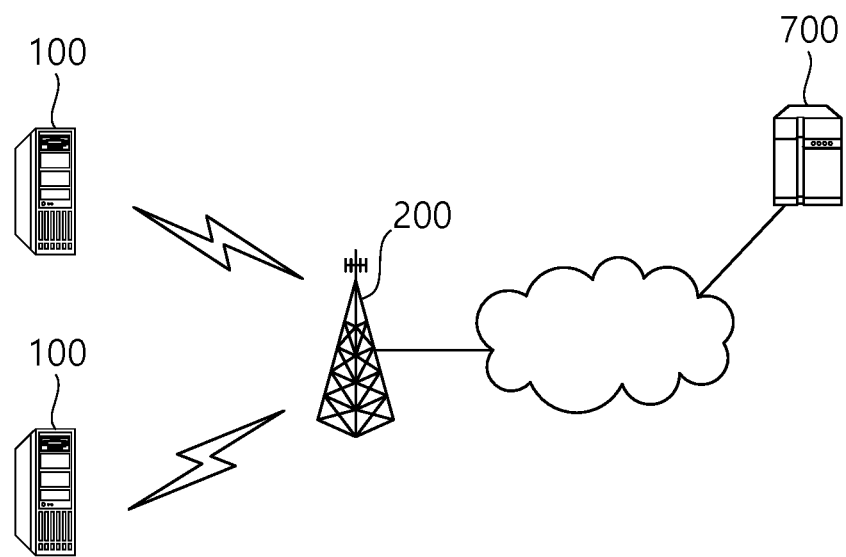
FIG. 4a illustrates one example of Internet of Things (IoT) communication.

FIG. 4a illustrates one example of Internet of Things (IoT) communication.

IoT refers to exchange of information through a base station 200 among IoT devices 100, which does not involve human interaction or exchange of information through the base station 200 between an IoT device 100 and a server 700. In this way, IoT is also called Cellular Internet of Things (CIoT) in that IoT communication employs a cellular base station.

IoT communication as described above is one type of Machine Type Communication (MTC). Therefore, an IoT device may also be called an MTC device.

IoT services may be distinguished from communication-based conventional services which require human intervention, including a wide range of services such as tracking, metering, payment, medical-care, and remote control. For example, IoT services may include meter reading, level measurement, use of surveillance cameras, reporting an inventory of a vending machine, and so on.

Since the amount of transmission data handled by IoT communication is small, and transmission and reception of uplink or downlink data occurs infrequently, it is preferable to lower the unit price of an IoT device 100 and to reduce battery consumption according to a low data transfer rate. Also, since an IoT device 100 has low mobility, channel conditions rarely change.

Figure 4B:
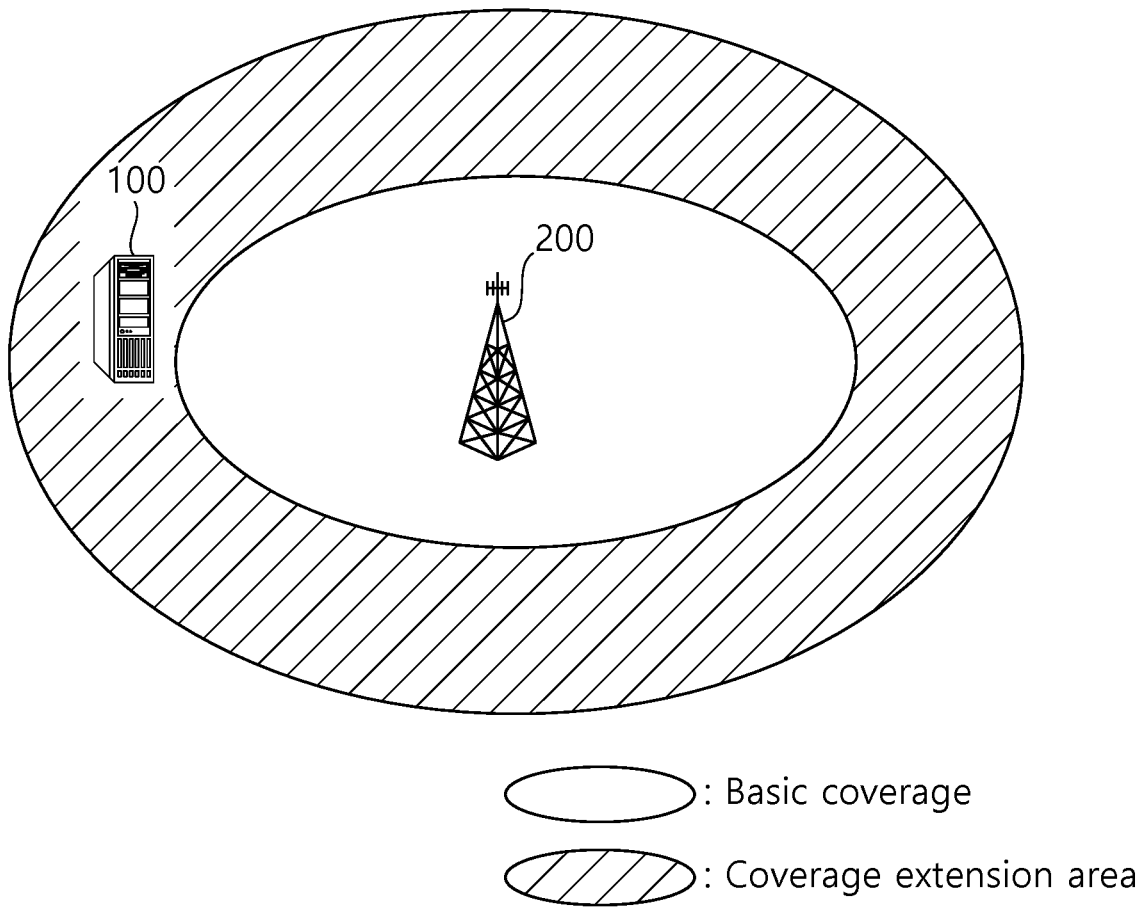
FIG. 4b illustrates cell coverage extension or enhancement for IoT devices.

FIG. 4b illustrates cell coverage extension or enhancement for IoT devices.

Recently, cell coverage extension or enhancement of a base station to accommodate IoT devices 100 is being considered, and various techniques for extending or enhancing cell coverage are under discussion.

It should be noted, however, that when cell coverage is extended or enhanced, and a base station transmits a downlink channel to an IoT device located in the coverage extension (CE) area or coverage enhancement (CE) area, the IoT device encounters a difficulty in receiving the downlink channel.

To solve the problem above, a downlink channel or an uplink channel may be transmitted repeatedly on several subframes. In this way, transmission of an uplink/downlink channel repeatedly on several subframes is referred to as bundle transmission.

Figure 4C:
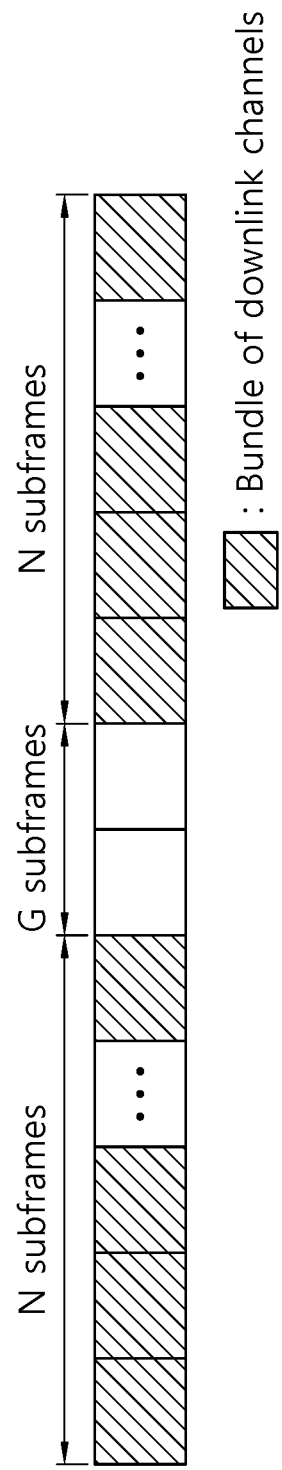
FIG. 4c illustrates one example of transmitting a bundle of downlink channels.

FIG. 4c illustrates one example of transmitting a bundle of downlink channels.

As may be known from FIG. 4c, a base station transmits a downlink channel (for example, PDCCH and/or PDSCH) repeatedly to an IoT device 100 located in a coverage extension area on several subframes (for example, N subframes).

Then the IoT device or base station receives a bundle of downlink/uplink channels on several subframes and improves a decoding success rate by decoding the whole or part of the bundle.

Figure 5A:
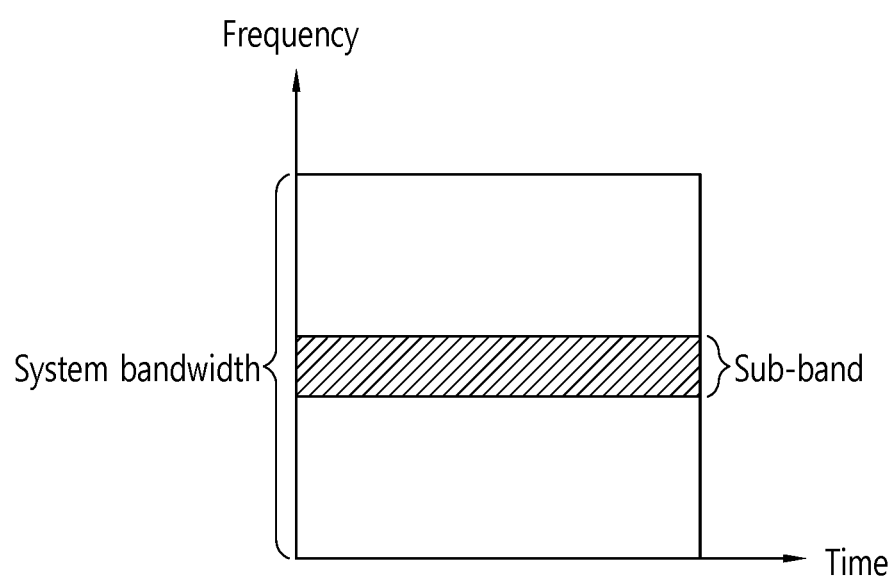
FIGS. 5a and 5b illustrate an example of a sub-band in which IoT devices operate.
Figure 5B:
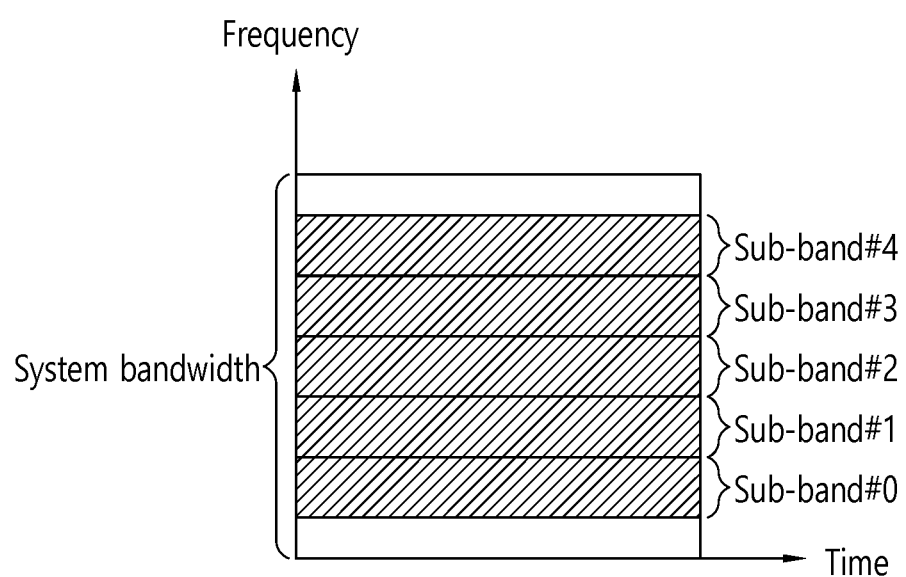

FIGS. 5a and 5b illustrate an example of a sub-band in which IoT devices operate.

As one solution for providing IoT devices at low cost, as shown in FIG. 5a, the IoT devices may use a sub-band of, for example, approximately 1.4 MHz independently of the system bandwidth of a cell.

At this time, as shown in FIG. 5a, the sub-band area in which the IoT devices operate may be located in the central area (for example, central six PRBs) of the system bandwidth of the cell.

Similarly, as shown in FIG. 5b, a plurality of sub-bands for IoT devices may be defined within one subframe for multiplexing of the IoT devices so that the IoT devices may use separate sub-bands. At this time, a majority of the IoT devices may use a different sub-band rather than the central area (for example, central six PRBs) of the system bandwidth of the cell.

As described above, the IoT communication operating with reduced bandwidth may be referred to as Narrow Band (NB) IoT communication or NB CIoT communication.

Figure 6:
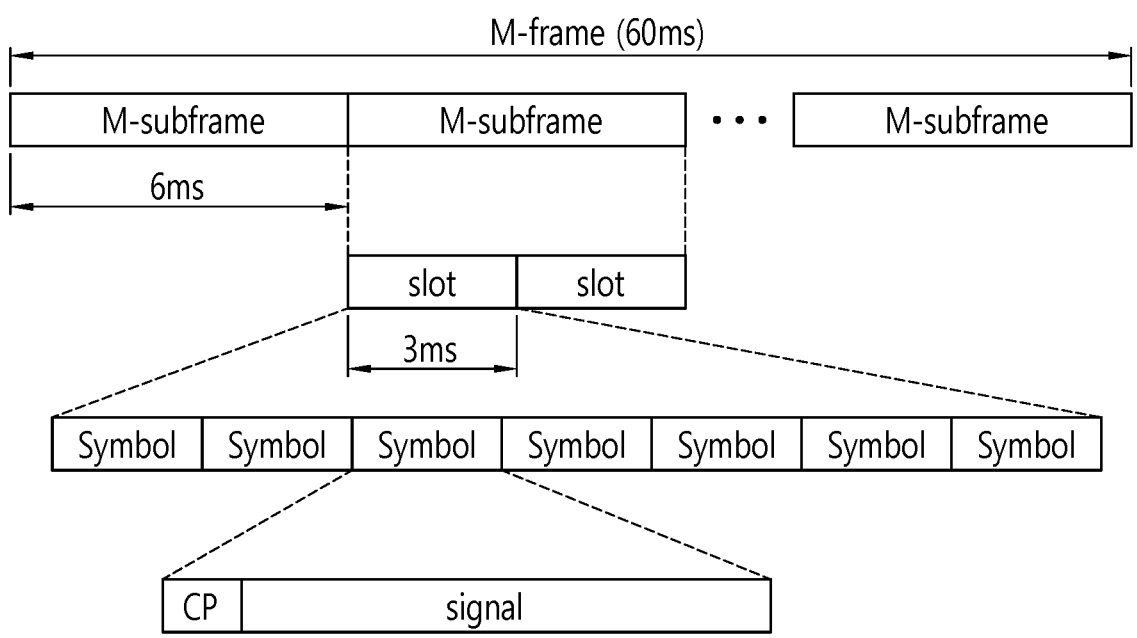
FIG. 6 illustrates an example where time resources that may be used for NB-IoT are represented in units of M-frames.

FIG. 6 illustrates an example where time resources that may be used for NB-IoT are represented in units of M-frames.

Referring to FIG. 6, a frame which may be used for NB-IoT is called an M-frame, the length of which may be 60 ms, for example. Also, a subframe which may be used for NB IoT is called an M-subframe, the length of which may be 6 ms, for example. Therefore, an M-frame may comprise 10 M-subframes.

Each M-subframe may comprise two slots, and each slot may be 3 ms, for example.

However, different from what is shown in FIG. 6, a slot which may be used for NB IoT may have a length of 2 ms, a subframe may accordingly have a length of 4 ms, and a frame may have a length of 40 ms. Regarding this possibility, more details will be given with reference to FIG. 7.

Figure 7:
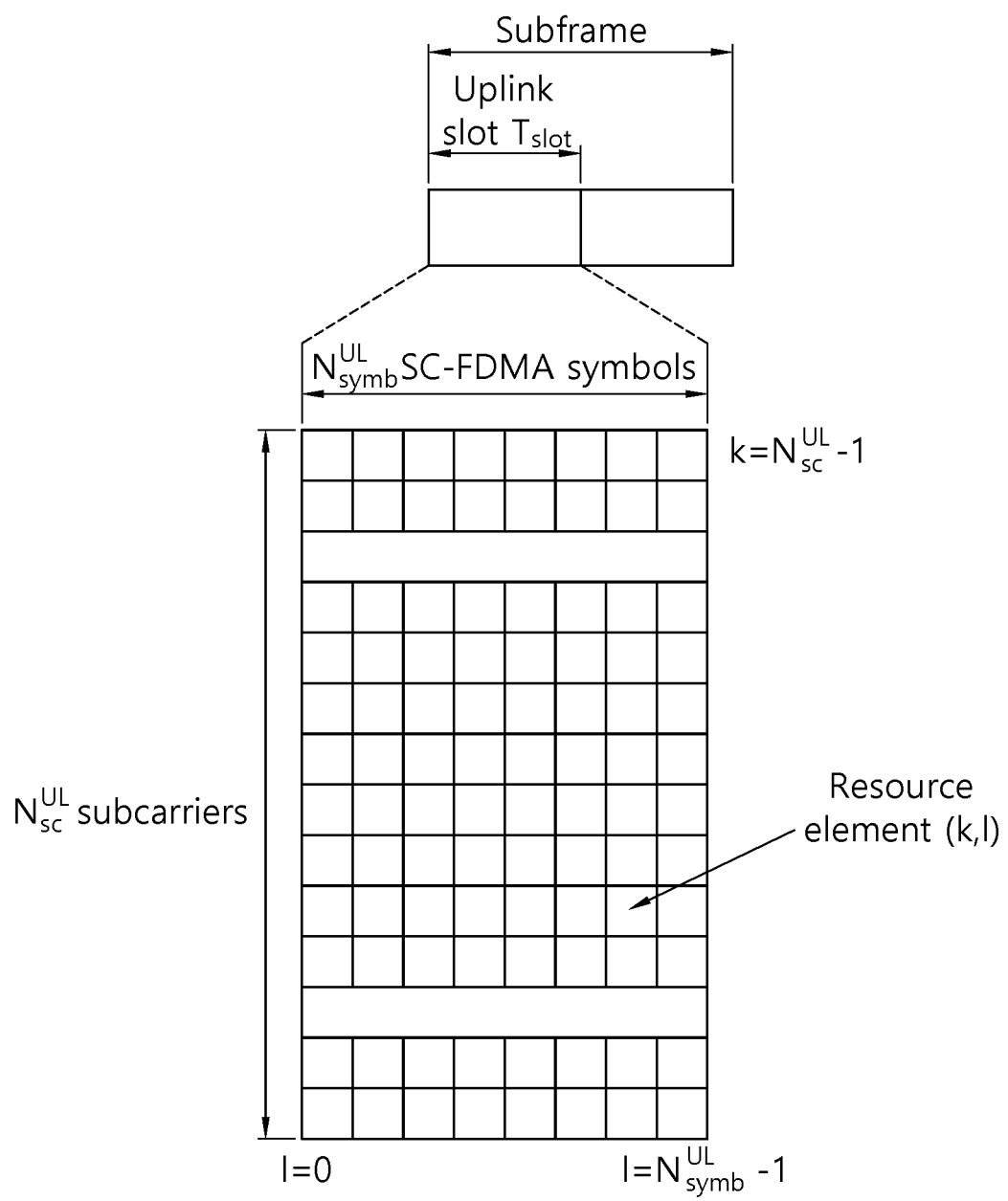
FIG. 7 is another example illustrating time resources and frequency resources that may be used for NB IoT.

FIG. 7 is another example illustrating time resources and frequency resources that may be used for NB IoT.

Referring to FIG. 7, a physical channel or physical signal transmitted on a slot from an uplink of NB-IoT includes $N_{symb}^{UL}$ SC-FDMA symbols in the time domain and $N_{SC}^{UL}$ subcarriers in the frequency domain. The uplink physical channel may be divided into a Narrowband Physical Uplink Shared Channel (NPUSCH) and a Narrowband Physical Random Access Channel (NPRACH). And a physical signal in the NB-IoT may become a Narrowband DeModulation Reference Signal (NDMRS).

The uplink bandwidths of $N_{SC}^{UL}$ subcarriers during $T_{slot}$ slots in the NB-IoT are as follows.

TABLE 3

| Subcarrier spacing | $N_{SC}^{UL}$ | $T_{slot}$ |
|---|---|---|
| Δf = 3.75 kHz | 48 | 61440*$T_s$ |
| Δf = 15 kHz | 12 | 15360*$T_s$ |

In the NB-IoT, each resource element (RE) of a resource grid may be defined by an index pair (k, l) within a slot, where k=0, . . . , $N_{SC}^{UL}$−1, and l=0, . . . , $N_{symb}^{UL}$−1, specifying an index in the time and frequency domain, respectively.

In the NB-IoT, a downlink physical channel includes a Narrowband Physical Downlink Shared Channel (NPDSCH), Narrowband Physical Broadcast Channel (NPBCH), and Narrowband Physical Downlink Control Channel (NPDCCH). And a downlink physical signal includes a Narrowband reference signal (NRS), Narrowband synchronization signal (NSS), and Narrowband positioning reference signal (NPRS). The NSS includes a Narrowband primary synchronization signal (NPSS) and a Narrowband secondary synchronization signal (NSSS).

Meanwhile, NB-IoT is a communication scheme for wireless devices using bandwidth reduced to satisfy low-complexity/low-cost constraints (namely, narrowband). The NB-IoT is aimed to allow as many wireless devices as possible to be connected by using the reduced bandwidth. Moreover, the NB-IoT communication is aimed to support cell coverage larger than the cell coverage provided in the legacy LTE communication.

Meanwhile, as may be known from Table 1, when subcarrier spacing is 15 kHz, a carrier having the reduced bandwidth includes only one PRB. In other words, NB-IoT communication may be performed by using only one PRB. Here, a wireless device assumes that NPSS/NSSS/NPBCH/SIB-NB is transmitted from a base station, where a PRB connected to receive the NPSS/NSSS/NPBCH/SIB-NB may be called an anchor PRB (or anchor carrier). Meanwhile, in addition to the anchor PRB (or anchor carrier), the wireless device may receive additional PRBs from the base station. Here, among the additional PRBs, those PRBs not expected to receive the NPSS/NSSS/NPBCH/SIB-NB from the base station may be called a non-anchor PRB (or non-anchor carrier).

The NRS is generated by a sequence $r_{l,n_s}(m)$, and the sequence $r_{l,n_s}(m)$ may be mapped to a complex-valued modulation symbol, namely $a_{k,l}^{(p)}$.

The complex-valued modulation symbol, namely $a_{k,l}^{(p)}$ is used as a reference signal for the antenna port p within a slot $n_s$.

$$a_{k,l}^{(p)} = r_{l,n_s}(m') \quad [\text{Eq. 1}]$$

$k = 6m + (v + v_{shift}) \mod 6$
$l = N_{symb}^{DL} - 2, N_{symb}^{DL} - 1$
$m = 0, 1$
$m' = m + N_{RB}^{max,DL} - 1$ The variable v and $v_{shift}$ represent the positions in the frequency domain with respect to other reference signals. v is determined by the following equation.

$$v = \begin{cases} 0 & \text{if } p = 2000 \text{ and } l = N_{symb}^{DL} - 2 \\ 3 & \text{if } p = 2000 \text{ and } l = N_{symb}^{DL} - 1 \\ 3 & \text{if } p = 2001 \text{ and } l = N_{symb}^{DL} - 2 \\ 0 & \text{if } p = 2001 \text{ and } l = N_{symb}^{DL} - 1 \end{cases} \quad [\text{Eq. 2}]$$

The cell-specific frequency shift is given as follows.

$$v_{shift} = N_{ID}^{Ncell} \mod 6. \quad [\text{Eq. 3}]$$

Next-Generation Mobile Communication Network

Due to the success of the long term evolution (LTE)/LTE-Advanced (LTE-A) for the fourth-generation mobile communication, a public interest in the next-generation (so-called 5G) mobile communication is growing, and researches into the next-generation mobile communication are conducted one after another.

The 5-th generation mobile communication, as defined by the International Telecommunication Union (ITU), refers to the technology aimed to provide a data transfer speed of up to 20 Gbps and an effective transfer speed faster than at least 100 Mbps everywhere. The official name of the 5-th generation mobile communication is 'IMT-2020', which is due to be commercialized by 2020 worldwide.

The ITU proposed three use case scenarios: enhanced Mobile BroadBand (eMBB), massive Machine Type Communication (mMTC), Ultra Reliable and Low Latency Communication (URLLC).

URLLC is related to a use scenario which requires high reliability and low latency. For example, such services as automated driving, factory automation, and augmented reality require high reliability and low latency (for example, latency less than 1 ms). The latency of the current 4G (LTE) technology is statistically 21-43 ms (best 10%) and 33-75 ms (median). This specification is not sufficient to support services requiring latency less than 1 ms. The eMBB described next is related to a use scenario requiring a mobile ultra-wideband.

In other words, the 5-th generation mobile communication system targets to provide a capacity higher than that of the current 4G LTE, improve density of mobile broadband users, and support high reliability and Machine Type Communication (MTC). 5G R&Ds also target lower latency and lower battery consumption than provided by the 4G mobile communication system to implement the Internet of things more efficiently. To realize the 5G mobile communication as described above, a new radio access technology (New RAT or NR) may be proposed.

In the NR, it may be taken into consideration that reception from a base station may use downlink subframes, and transmission to the base station may use uplink subframes. This scheme may be applied to paired spectra and unpaired spectra. One pair of spectra indicates that two carrier spectra are involved for downlink and uplink operations. For example, in one pair of spectra, one carrier may include a downlink and uplink bands forming a pair with each other.

Figure 8:
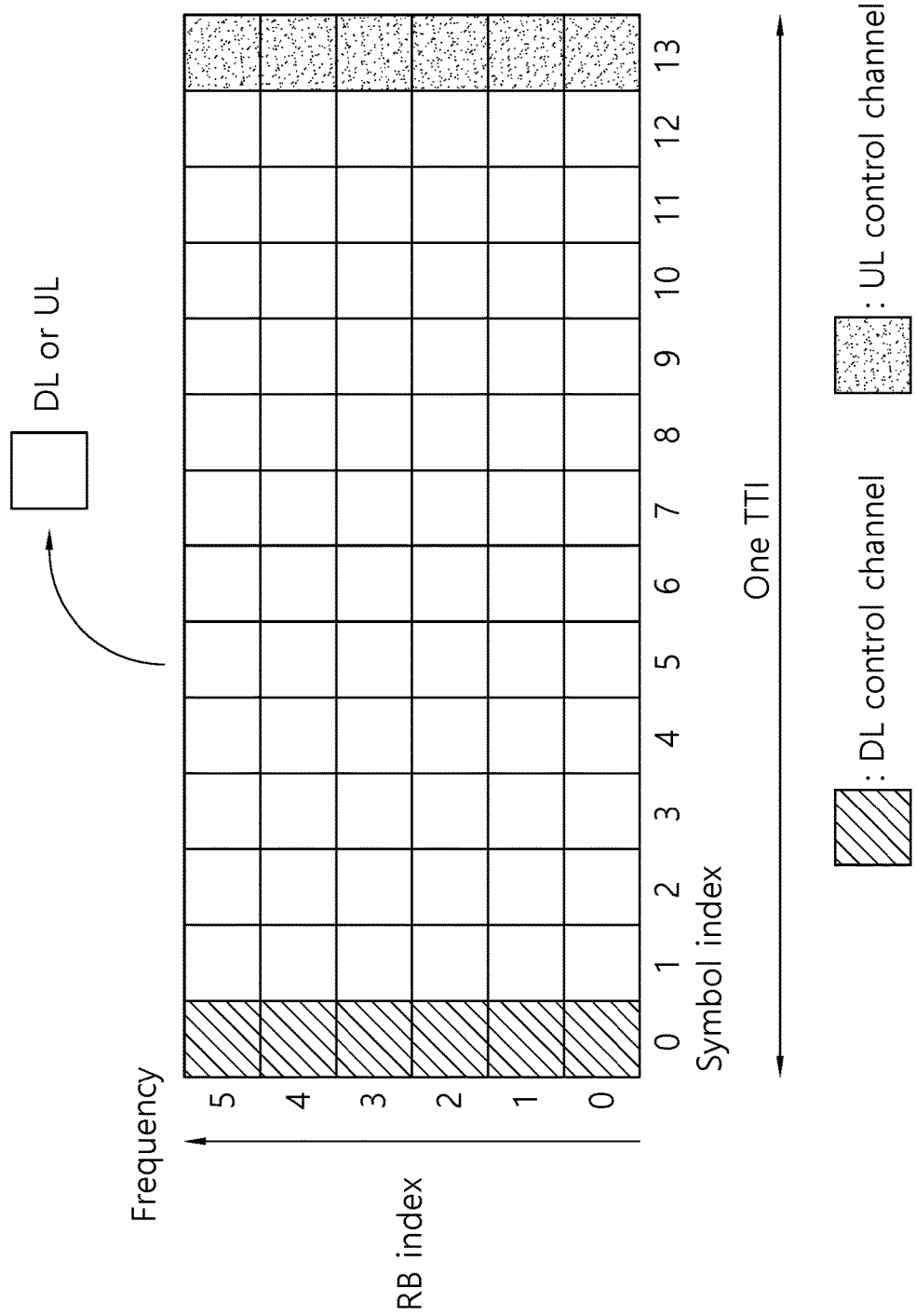
FIG. 8 illustrates an example of subframe type in the NR.

FIG. 8 illustrates an example of subframe type in the NR.

The transmission time interval (TTI) shown in FIG. 8 may be called a subframe or a slot for the NR (or new RAT). The subframe (or slot) of FIG. 8 may be used in the TDD system of NR (or new RAT) to minimize data transfer latency. As shown in FIG. 8, a subframe (or slot) comprises 14 symbols in the same way as the current subframe. The leading symbol of a subframe (or slot) may be used for DL control channel, and the trailing symbol of the subframe (or slot) may be used for UL control channel. The remaining symbols may be used for DL data transmission or UL data transmission. According to the aforementioned subframe (or slot) structure, downlink transmission and uplink transmission may be carried out sequentially in one subframe (or slot). Therefore, downlink data may be received within the subframe (or slot), or an uplink acknowledgement response (ACK/NACK) may also be transmitted within the subframe (or slot). The structure of the subframe (or slot) as described above may be referred to as a self-contained subframe (or slot). When this subframe (or slot) structure is used, time required to retransmit data which has caused a reception error is reduced, leading to minimization of final data transmission waiting time. In the self-contained subframe (or slot) structure, however, a time gap may be needed for a transitioning process from a transmission mode to a reception more or vice versa. To this end, part of OFDM symbols employed for transitioning from DL to UL transmission in the subframe structure may be designated as a guard period (GP).

Support of Various Numerologies

In the next-generation system, according to the advances in the wireless communication technology, a plurality of numerologies may be provided for a UE.

The numerology may be defined by the length of cyclic prefix (CP) and subcarrier spacing. A single cell may provide a plurality of numerologies to a UE. If the index of numerology is represented by μ, each subcarrier spacing and the corresponding CP length may be given as follows.

TABLE 4

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of normal CP, if the numerology index is represented by μ, the number of OFDM symbols per slot ($N_{symb}^{slot}$), the number of slots per frame ($N_{slot}^{frame,\mu}$), and the number of slots per subframe ($N_{slot}^{subframe,\mu}$) are given as follows.

TABLE 5

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of extended CP, if the numerology index is represented by μ, the number of OFDM symbols per slot ($N_{symb}^{slot}$), the number of slots per frame ($N_{slot}^{frame,\mu}$), and the number of slots per subframe ($N_{slot}^{subframe,\mu}$) are given as follows.

TABLE 6

| μ | $N_{symb}^{slot}$ | $N_{slot}^{frame,\mu}$ | $N_{slot}^{subframe,\mu}$ |
|---|---|---|---|
| 2 | 12 | 40 | 4 |

Meanwhile, in the next-generation mobile communication, each symbol within a slot may be used as a downlink or an uplink as shown in the table below. In the table below, the uplink is denoted by U while the downlink is denoted by D. In the table below, X represents a symbol which may be used flexibly as an uplink or a downlink.

TABLE 7

| Format | \multicolumn{14}{c}{Symbol number in a slot} |
|---|---|---|---|---|---|---|---|---|---|---|---|---|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | D | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | X | U | U | U | U | U |
| 56 | D | X | U | U | U | U | U | D | X | U | U | U | U | U |

TABLE 7-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

Disclosure of the Present Specification

The present specification proposes methods for transmitting and receiving a reference signal (RS) on a special subframe to support Narrow band Internet of Things (NB-IoT) employing the Time-Division Duplexing (TDD) scheme.

NB-IoT may operate in one of the following three operation modes. The three operation modes may include a guard-band operation mode, stand-alone operation mode, and in-band operation mode. After setting the operation mode, the base station transmits an upper layer signal through, for example, a Master Information Block (MIB) or a System Information Block (SIB) to a UE (for example, an NB-IoT device).

The in-band operation mode refers to a mode where an NB-IoT cell operates in part of a band in which a first LTE cell operates. The in-band operation mode is further divided into an in-band same PCI mode (inband-samePCI) where the NB-IoT cell and the LTE cell share the same physical cell ID (hereinafter, it is also called a PCI) and an in-band different PCI mode (inband-DifferentPCI) where the NB-IoT cell and the LTE cell use different PCIs.

In the in-band same PCI mode, the number of NRSs is the same as the number of CRSs.

The guard-band operation mode refers to a mode where part of the LTE band is designated as a guard band, and the NB-IoT cell uses the guard band not used by the LTE cell. For example, the NB-IoT cell may operate one a guard band existing between a first band where a first LTE cell operates and a second band where a second LTE cell operates.

The stand-alone operation mode refers to a mode where the NB-IoT cell operates on a band where a non-LTE cell operates. For example, the NB-IoT cell may operate in part of a band where a GSM cell operates.

In what follows, for the convenience of descriptions, methods for transmitting an RS on a special subframe in the NB-IoT will be mostly described; however, it should be noted that the proposed methods may be applied to general communication systems in the same manner.

I. First Disclosure: Transmission of a Narrowband Reference Signal (NRS) on a Special Subframe First, except for the case where the operation mode of NB-IoT is the in-band same PCI mode (inband-samePCI), an NB-IoT device (or UE) is unable to use a CRS. Also, the more the number of available downlink reference signals, the better the accuracy of measurement performed by an NB-IoT device (or UE) and the performance of channel estimation become. However, since NB-IoT has been designed by considering only the FDD scheme of the 3GPP release-14 and does not take into account the structure of a TDD special subframe, NRS transmission based on the TDD scheme may not be easily performed if the existing definition is reused. More specifically, in the case of NB-IoT, a CRS is not used, but an NRS is utilized for improving measurement accuracy and performing channel estimation. The NRS has been designed by using the FDD scheme since the release-14. However, a method for transmitting an NRS on a TDD special subframe has not been studied yet. To this regard, the first disclosure of the present specification proposes a method for transmitting an RS which may be used by an NB-IoT device (or UE) on a special subframe. More specifically, the corresponding RS may become an NRS in the NB-IoT communication. The methods proposed below may be used separately, or in the form of a combination of one or more of the methods.

I-1. Method for Transmitting NRS on Third Symbol of Special Subframe

The present section proposes a method for transmitting an NRS by using a third symbol of a special subframe. The third symbol refers to a symbol appearing thirdly on the special subframe.

Figure 9:
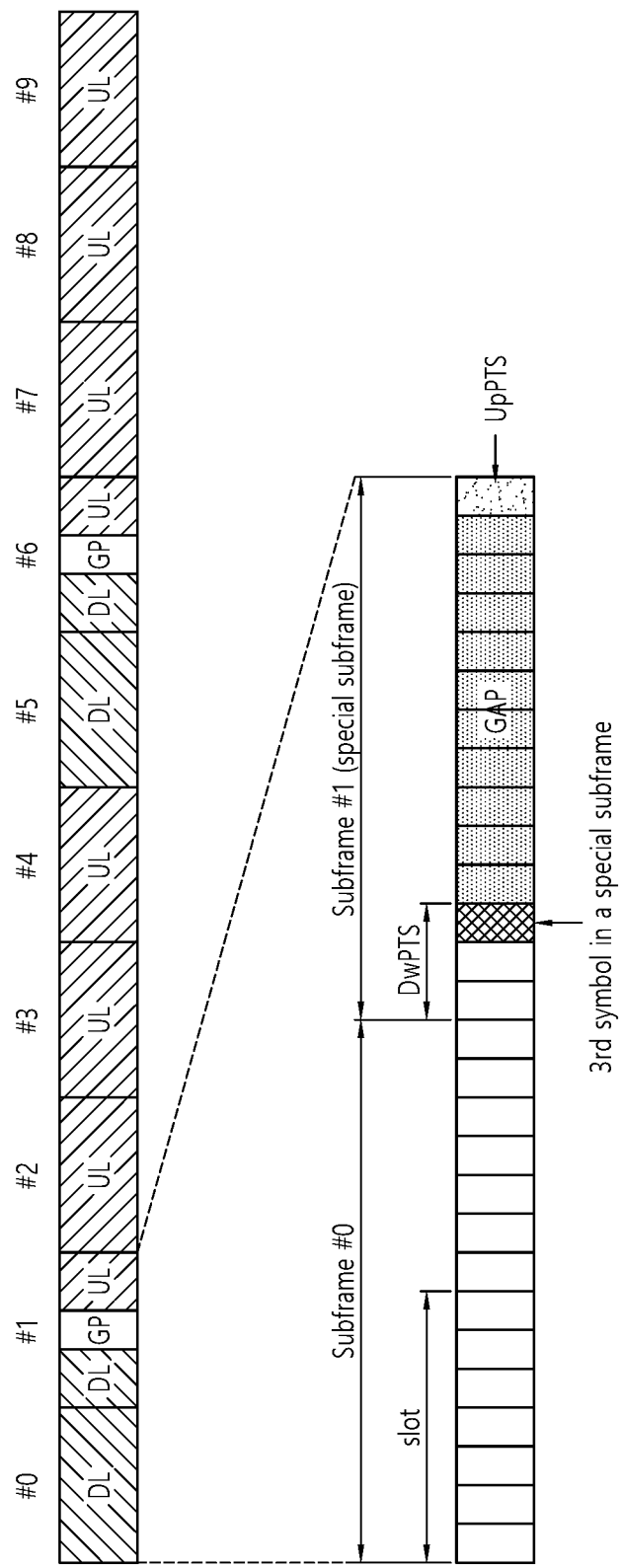
FIG. 9 illustrates a third symbol of a special subframe described in Section I-1.

FIG. 9 illustrates a third symbol of a special subframe described in Section I-1.

The example of FIG. 9 assumes a situation of TDD UL-DL configuration #0 and special subframe configuration #0. However, the definition of the third symbol may be applied to other TDD UL-DL configuration #0 in the same manner.

A specific example to which the proposal above is applied may be described as follows.

I-1-1. Application Method May Be Determined According to Special Subframe Configuration Index I-1-1-1. When a specific special subframe configuration is used, an NRS may be transmitted to all of the special subframes from the entire carriers available for NB-IoT.

The aforementioned specific special subframe configuration may correspond to #0 and #5 of Table 2.

The aforementioned specific special subframe configuration may be defined by a special subframe configuration where the length of DwPTS is less than X symbols.

At this time, it is possible that X=3.

The available carrier described above may include an anchor carrier from which an NB-IoT device (or UE) acquires synchronization and also include a non-anchor carrier configured through higher layer signaling.

If information related to special subframe configuration may be distinguished in a step for acquiring an NPSS and an NSSS, and the distinguished information may be used for determining whether an NRS is always transmitted from a third symbol of the special subframe, The NB-IoT device (namely, UE) may use the NRS of the third symbol of the special subframe during a cell selection process.

The NB-IoT device (namely, UE) may use the NRS of the third symbol of the special subframe for decoding of an NPBCH.

I-1-1-2. When specific special subframe configuration is used, and the special subframe among carriers available for NB-IoT is designated as a valid subframe, an NRS may be transmitted.

The aforementioned specific special subframe configuration may correspond to #1, #2, #3, #4, #6, #7, #8, and #9 of Table 2.

Option a. The aforementioned valid subframe is defined as a subframe to which an NB-IoT device (or UE) expects an NPDCCH or NPDSCH to be transmitted. This information may be delivered to an NB-IoT device (or UE) through higher layer signaling such as one using an SIB or an RRC signal.

Option b. The aforementioned valid subframe may be an independent meaning defined only for a special subframe. In this case, the valid subframe with respect to the special frame may be defined as a subframe to which an NRS is transmitted irrespective of transmission of an NPDCCH or an NPDSCH. This information may be delivered to an NB-IoT device (or UE) through higher layer signaling such as one using an SIB or an RRC signal.

In the case of a special subframe except for the valid subframe delivered through higher layer signaling, information about the special subframe to be transmitted dynamically by an NRS through DCI may be delivered to an NB-IoT device (or UE).

When the information is delivered dynamically through DCI, the delivery may be applied in conjunction with the option a or option b.

The aforementioned available carrier may include an anchor carrier from which an NB-IoT device (or UE) acquires synchronization also include a non-anchor carrier configured through higher layer signaling.

I-1-1-3. When specific special subframe configuration is used, transmission of an NRS may be determined according to whether to transmit NPDCCH or NPDSCH.

The aforementioned specific special subframe configuration may correspond to #9 of Table 2.

For example, when an NPDCCH or an NPDSCH is used, an NRS may be made not to be transmitted to the corresponding special subframe.

Whether an NPDCCH or an NPDSCH is transmitted from the special subframe may be delivered through higher layer signaling such as one using an SIB or an RRC signal or through DCI.

At this time, the SIB, RRC signal, or DCI may include an information field of 1-bit length which indicates whether to use a special subframe for data transmission or NRS transmission or may include an information field in the form of a bitmap.

As in the proposed method, the reason why the application id determined according to the special subframe configuration index is that availability of the third symbol of the special subframe is changed according to the special subframe configuration. For example, in the case of special subframe configuration #0 and #5, the third symbol of the special subframe is not used in the legacy LTE system except for central six RBs, the special subframe is always available for an NB-IoT carrier. Meanwhile, in the case of special subframe configuration #1, #2, #3, #4, #6, #7, #8, and #9, the special frame may be used as an LTE PDSCH; therefore, information about whether the corresponding special subframe is available in the NB-IoT communication has to be provided.

I-1-2. Application Method May Be Determined According to Operation Mode of NB-IoT I-1-2-1. When the operation mode is in-band, an NRS may be transmitted only when a specific condition is satisfied.

At this time, the specific condition is a condition for a special subframe configuration index.

The specific condition may be a condition about whether the special subframe is a valid subframe.

The specific condition may be related to whether the carrier is an anchor carrier and/or a carrier to which an SIB for NB-IoT (for example, SIB1-NB) is transmitted.

At this time, the NB-IoT device (or UE) may assume that an NRS is always transmitted in a DwPTS of the corresponding carrier.

I-1-2-2. When operation mode is guardband or stand-alone, NRS may be always transmitted.

After checking the operation mode, an NB-IoT device (or UE) notices that an NRS always exists in the third symbol of a DwPTS and uses the fact for decoding.

To this end, all of the special subframe configurations include NRS transmission in the third symbol.

For example, it may be configured so that the 3rd, 6th, 7th, and 10th OFDM symbols are used for NRS transmission in the special subframe, and an NRS is transmitted at the corresponding positions when the DwPTS length includes the OFDM symbol index.

The reason why the application is determined according to the operation mode as in the proposed method is that when the operation mode is guardband or standalone, the DwPTS area may be used only for the purpose of NB-IoT communication. On the other hand, when the operation mode is inband, except for a specific situation, it is not possible to determine whether a special subframe area is used only for the purpose of NB-IoT communication, use of inband mode may be restricted. If the proposed method is used, a UE is able to utilize more NRSs in a situation where only a limited amount of NRSs is allowed to be used, such as the SIB1-NB, and therefore, performance improvement may be obtained.

I-1-3. NRS Used in the Third Symbol of Special Subframe May Use the Following Options.

Option a. A method for generating an NRS used by other downlink subframe and a method for determining frequency domain resources may be used.

A method for generating a sequence of the NRS may reuse an existing method for generating an NRS sequence according to Eqs. 1 to 3.

The position of a frequency domain resource of the NRS may be determined by the k value which determines a mapping position in the frequency domain of the method defined by Eq. 1.

At this time, the position of the time domain resource to be applied may be determined so that l=2 at the first slot. This position corresponds to the third symbol of the special subframe. An embodiment thereof is illustrated in FIG. 10.

Option b. The option b may determine to use a method for generating an NRS newly defined for the third symbol of a special subframe and a frequency domain mapping rule. At this time, the newly defined NRS may be designed to use all of 12 resource elements (REs) used by the third symbol.

As one example, a Zadoff-Chu sequence may be used. At this time, the root index of the Zadoff-Chu sequence may be determined by NNcellID which distinguishes an NB-IoT cell ID.

For example, a Gold sequence may be used. At this time, the $C_{init}$ value of the Gold sequence may be determined by NNcellID which distinguishes an NB-IoT cell ID.

This method may be applied only to the case where the corresponding NRS symbol is not used for the purpose of data transmission. To this end, a base station may deliver information about whether a newly defined NRS is transmitted to the corresponding position to an NB-IoT device (or UE) through higher layer signal or DCI.

The option a described above provides an advantage that an existing method may be reused. The option b may be intended to lower PAPR by using all of the REs when data are not transmitted to the corresponding symbol.

I-1-4. Energy per resource element (EPRE) of NRS transmitted from the third symbol of special subframe may be configured separately from the EPRE of NRS transmitted from a different subframe.

I-1-4-1. The EPRE of an NRS transmitted from the third symbol of a special subframe may be determined by an offset (or in the form of a multiple) from the EPRE of an NRS transmitted from a different subframe.

Option a. At this time, the EPRE of an NRS transmitted from the third symbol of a special subframe may be delivered to an NB-IoT device (or UE) through higher layer signaling using an SIB or an RRC signal.

At this time, the EPRE of an NRS transmitted from the third symbol of the special subframe may be determined by a fixed offset from the EPRE of an NRS transmitted from a different subframe.

The option above may be applied only for the case where data are not mapped to the third symbol of the special subframe.

For example, when the number of REs to which an NRS from the third symbol of the special subframe is mapped is N, and the EPRE of an NRS from a different DL subframe is defined by ENRS, the EPRE of the NRS used at the third symbol of the special subframe may be defined by the mathematical equation below.

$$E_{NRS\_special} = E_{NRS} \times \frac{12}{N} \quad [\text{Eq. 4}]$$

I-2. Method for Transmitting NRS by Using First to Third Symbols of Special Subframe The method proposed in the present section includes a method for transmitting an NRS using a first to third symbols of a special subframe. At this time, the first to the third symbols indicate the symbols appearing firstly, secondly, and thirdly on the special subframe, respectively.

Figure 11:
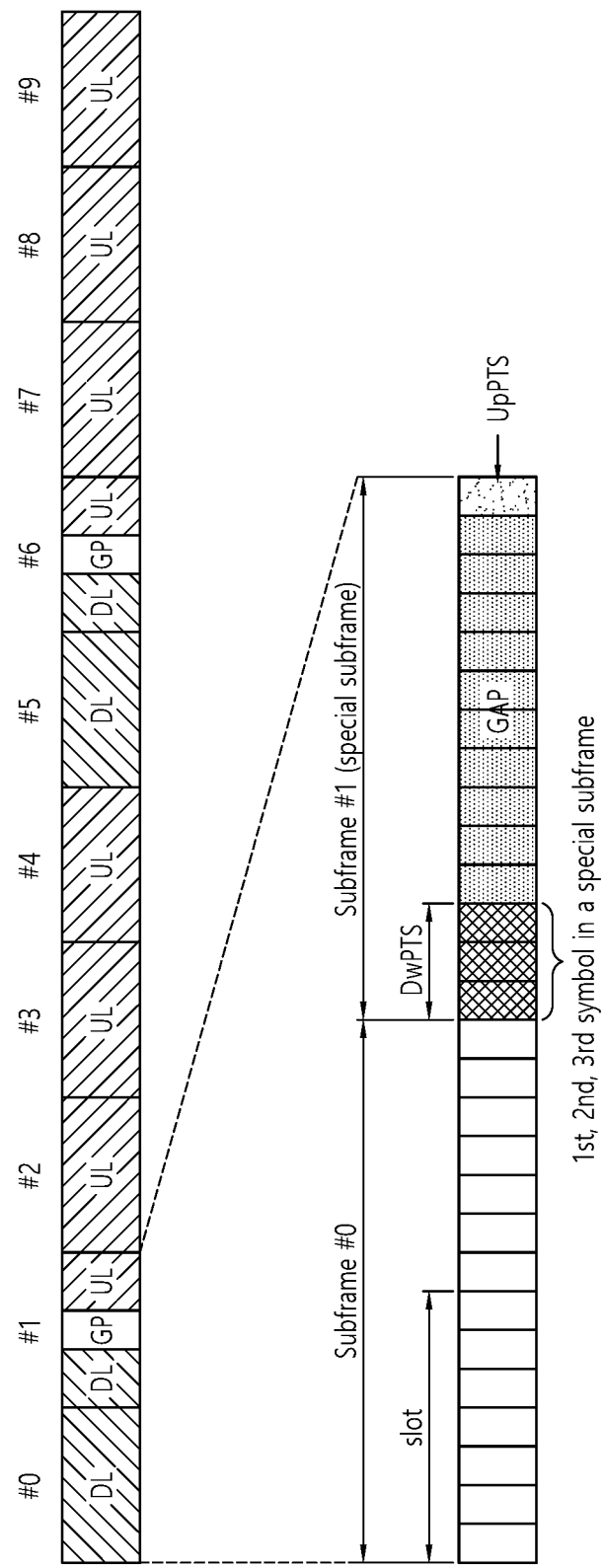
FIG. 11 illustrates a symbol to which an NRS is mapped according to Section I-2.

FIG. 11 illustrates a symbol to which an NRS is mapped according to Section I-2.

The embodiment of FIG. 11 assumes a situation based on UL-DL configuration #0 and special subframe configuration #0, but it should be clearly understood that the definition of the first, second, and third symbols may be applied in the same way for other TDD configurations.

The proposed method is a special case of the method described in Section I-1, and the operations other than those given in the descriptions below may be performed in the same manner as in the method described in Section I-1. For example, a method for distinguishing a special subframe configuration index or a method for configuring the EPRE for which the corresponding method is applied may be applied in the same manner as in the method described in Section I-1.

A specific method to which the proposed specification is applied may be described as follows.

The proposed specification may be applied only to the case where the operation mode of the corresponding cell is the guard band or stand-alone.

If the operation mode is in-band, an NB-IoT device (or UE) may assume that an NRS is transmitted according to a criterion described in Section I-1.

If the NB-IoT device (or UE) has not obtained information about the operation mode of the corresponding cell yet, it may be assumed that the NRS is transmitted according to the criterion described in Section I-1.

The reason why the operation mode determines whether to use the method as described above is that in the case of the guard band operation mode and the stand-alone mode, the control region used for the legacy LTE system is not configured, and thus the first and second symbols may be used additionally. Also, since an NRS is transmitted by using a larger number of symbols, an advantage is obtained that the number of REs which may be used for an NB-IoT device (or UE) to perform channel measurement or estimation is increased.

I-2-1. NRS used in the first, second, and third symbols of special subframe may be as follows.

Option a. The option a may determine to use a method for generating an NRS used in a different downlink subframe and a method for determining frequency domain resources.

A method for generating a sequence of the NRS may reuse an existing method for generating an NRS sequence according to Eqs. 1 to 3.

The position of the NRS in the frequency domain may be determined by the k value which determines a mapping position in the frequency domain according to the method defined by Eq. 1.

At this time, the position of an applied time domain resource may be determined as follows.

In the first slot, l=0, 1. This corresponds to the position indicating the first and the second symbol of a special subframe.

In the first slot, l=1, 2. This corresponds to the position indicating the second and the third symbol of the special subframe.

In the first slot, l=0, 1, 2.

At this time, when l=0, 1, it may be determined to use an existing method for generating an NRS according to Eqs. 1 to 3.

At this time, when l=2, it may be determined to use a method for generating an NRS mapped to the third symbol in Section I-1.

Option b. The option b may determine to use a method for generating an NRS newly defined for the first, second, and third symbols of a special subframe and a frequency domain mapping rule.

At this time, the newly defined NRS may be designed to form a sequence of length 12 with reference to 12 resource elements (REs) used by one symbol.

A sequence generated with reference to one symbol may be mapped repeatedly onto three symbols used for NRS transmission in a special subframe. At this time, a cover code which is intended for distinguishing an antenna port or cell ID may be applied to each symbol.

At this time, the cover code applied to the third symbol may be determined to have a value of 1.

As one example of a sequence mapped to one symbol, the Zadoff-Chu sequence may be used. At this time, the root index of the Zadoff-Chu sequence may be determined by NNcellID which distinguishes an NB-IoT cell ID.

As one example of a sequence mapped to one symbol, a Gold sequence may be used. At this time, the $C_{init}$ value of the Gold sequence may be determined by NNcellID which distinguishes an NB-IoT cell ID.

The option a is advantageous in that an existing method may be reused. When a method with a condition of l=0, 1, 2 of the option a is used together, an advantage is obtained that even when an NB-IoT device (or UE) does not know the operation mode, the NRS of the third symbol may be estimated based on the method with a condition of l-1. A method based on the option b may be aimed to lower PAPR by using all of the REs when data are not transmitted to the corresponding symbol. At this time, a method for generating an NRS of the third symbol and a method for applying a cover code may be intended for the NRS of the third symbol to be used even when an NB-IoT device (or UE) does not know the operation mode.

I-3. Method for Transmitting NRS by Using the Sixth and Seventh Symbols of Special Subframe The present section proposes a method for transmitting an NRS by using the sixth and seventh symbols of a special subframe. At this time, the sixth and the seventh symbol refer to the symbols appearing sixth and seventh on the special subframe, respectively.

Figure 12:
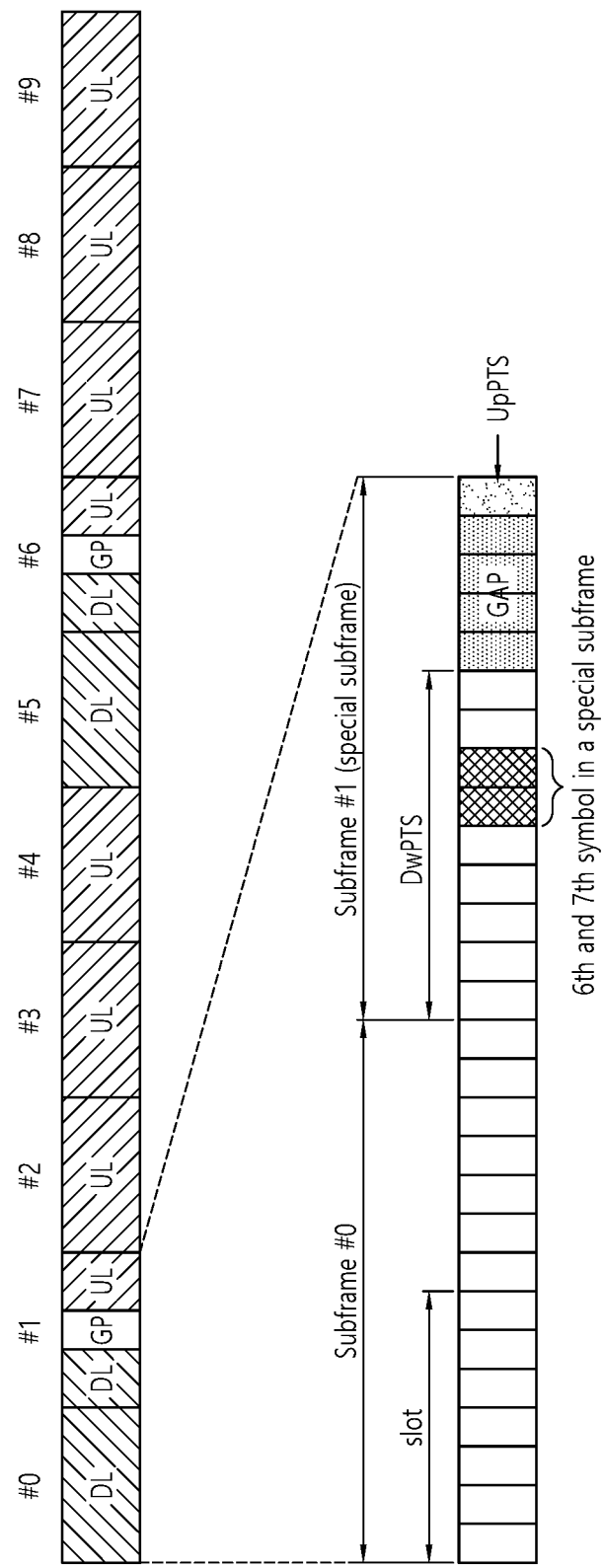
FIG. 12 illustrates a symbol to which an NRS is mapped according to Section I-3.

FIG. 12 illustrates a symbol to which an NRS is mapped according to Section I-3.

The embodiment of FIG. 12 assumes a situation based on UL-DL configuration #0 and special subframe configuration #1, but an NRS may also be transmitted on the sixth and seventh symbols for the case of a different TDD configuration.

A specific method to which the proposed specification is applied may be described as follows.

I-3-1. Application method may be determined according to special subframe configuration index I-3-1-1. When a specific special subframe configuration is used, the proposed method may not be applied.

The aforementioned specific special subframe configuration may correspond to #0 and #5 of Table 2.

The aforementioned specific special subframe configuration may be defined by a special subframe configuration where the length of DwPTS is less than X symbols.

At this time, it is possible that X=3.

I-3-1-2. When a specific special subframe configuration is used, and the special subframe among carriers available for NB-IoT is designated as a valid subframe, an NRS may be transmitted.

The aforementioned specific special subframe configuration may correspond to #1, #2, #3, #4, #6, #7, #8, and #9 of Table 2.

Option a. The aforementioned valid subframe is defined as a subframe to which an NB-IoT device (or UE) expects an NPDCCH or NPDSCH to be transmitted. This information may be delivered to an NB-IoT device (or UE) through higher layer signaling such as one using an SIB or an RRC signal.

Option b. The aforementioned valid subframe may be an independent meaning defined only for a special subframe. In this case, the valid subframe with respect to the special frame may be defined as a subframe to which an NRS is transmitted irrespective of transmission of an NPDCCH or an NPDSCH. This information may be delivered to an NB-IoT device (or UE) through higher layer signaling such as one using an SIB or an RRC signal.

In the case of a special subframe except for the valid subframe delivered through higher layer signaling, information about the special subframe to be transmitted dynamically by an NRS through DCI may be delivered to an NB-IoT device.

When the information is delivered dynamically through DCI, the delivery may be applied in conjunction with the option a or option b.

The aforementioned available carrier may include an anchor carrier from which an NB-IoT device (or UE) acquires synchronization also include a non-anchor carrier configured through higher layer signaling.

More specifically, in the case of special subframe configuration #9, it is proposed as follows.

It may be determined that only the sixth symbol is used for NRS transmission. This may be intended to guard a DwPTS slot available for the special subframe configuration #9.

Both of the sixth and seventh symbols may be used for NRS transmission. This may be intended to increase transmission of the NRS when there is no significant difficulty in securing GAP.

The base station may determine whether to transmit an NRS to the seventh symbol, and this information may be delivered to an NB-IoT device (or UE) through higher layer signaling using an SIB or an RRS signal.

In the method described above, the cases of special subframe configuration #0 and #5 may be excluded from application since the sixth and seventh symbols of the special subframe are not configured to be in the DwPTS region. On the other hand, since the special subframe may be used as the LTE PDSCH in the cases of special subframe configuration #1, #2, #3, #4, #6, #7, #8, and #9, information about whether the corresponding special subframe is available for NB-IoT has to be provided.

I-3-1-3. When an NRS is transmitted from the sixth and seventh symbols of a special subframe, it may be proposed as follows.

A method for generating an NRS used in a different downlink subframe and a method for determining a time-frequency domain resource may determine to use a resource corresponding to a first slot.

If a special subframe configuration #9 is used, and only the sixth symbol is used for NRS transmission, a time resource to be used may be determined only for the case where l=5.

I-3-1-4. Energy per resource element (EPRE) of an NRS transmitted from the sixth and seventh symbols of a special subframe may be configured separately from the EPRE of an NRS transmitted from a different subframe.

At this time, the EPRE of an NRS transmitted from the special subframe may be determined by an offset (or in the form of a multiple) from the EPRE of an NRS transmitted from a different subframe.

At this time, the EPRE of an NRS transmitted from the special subframe may be delivered to an NB-IoT device (or UE) through higher layer signaling using an SIB or an RRC signal.

The case where the EPRE of an NRS transmitted from a different subframe is applied differently may be limited to the case where an NPDCCH or NPDSCH is not transmitted to the corresponding special subframe.

At this time, the base station may deliver information about whether the corresponding special subframe is to be used as an NPDCCH or NPDSCH through higher layer signaling using an SIB or an RRC signal.

II. Second Disclosure: Uplink Reference Signal in a Special Subframe

In the TDD scheme, the uplink transmission region of a special subframe is limited to UpPTS region. In general, the UpPTS is determined to have a symbol length of 1 or 2. A legacy LTE UE may use the region for the purpose of an SRS or a PRACH. In the case of NB-IoT, since the minimum unit for NPUSCH transmission is fixed as a slot, the UpPTS of a special subframe may not be appropriate for data transmission. Also, when intervals among groups of symbols used as transmission units for NPRACH transmission and hopping among the symbol groups are considered, the UpPTS may not be appropriate for transmission of the NPRACH. Also, the NB-IoT technology of up to release 14 does not define an operation for transmitting an SRS.

To this regard, the present invention proposes a method to be used for transmitting an uplink reference signal. More specifically, the proposed method for transmitting an uplink reference signal, when used for NB-IoT, may have the form and purpose as an SRS is transmitted. The methods described below may be used independently of each other or in the form of a combination of one or more methods.

II-1. Method for Configuring to Transmit an SRS Only for a Valid Special Subframe A method proposed by the present specification may be determined to operate only for a case where a special subframe is configured as a valid subframe. At this time, a valid subframe refers to a subframe configured by a base station, which allows an NB-IoT device (or UE) to perform uplink transmission. At this time, a valid subframe for an SRS works as information to indicate whether each special subframe is allowed for uplink transmission, which may be provided independently. This information may be informed to an NB-IoT device (or UE) through higher layer signal using an SIB or an RRC signal. If aperiodic SRS transmission is configured by using an NPDCCH, information about a valid subframe may be configured dynamically by using a predetermined area of DCI.

II-2. Method for Transmitting an SRS to One or More Carriers by Using Carrier Hopping Since NB-IoT is designed to operate using one carrier (more specifically, one PRB comprising 12 subcarriers), it may be inappropriate to transmit an SRS to a plurality of carriers simultaneously. Therefore, when a plurality of carriers (namely anchor carrier and a plurality of non-anchor carriers) are available, a method for transmitting an SRS is needed for carriers to which an SRS may be transmitted. A method proposed in the present section may include a method for hopping carriers to which an SRS is transmitted to perform an SRS operation on a plurality of carriers.

Carrier hopping may be performed on an anchor carrier and/or non-anchor carriers configured for an NB-IoT device (or UE). At this time, target carriers on which carrier hopping is performed may be determined by a combination of one or more options given below.

Option a. Carrier hopping is determined to be performed on the carriers configured by an SIB so that an NB-IoT device (or UE) may perform paging or NPRACH.

Option b. Carrier hopping may be performed on the carriers configured separately through higher layer signaling using an SIB or an RRC signal.

Option c. Carrier hopping may be performed on the carriers configured separately through DCI.

Carrier hopping may not be performed while repeated transmission is performed. When the number of repetitions that an NB-IoT device (or UE) has to perform for each carrier to support coverage is predetermined, carrier hopping may be determined not to be performed while the corresponding repetitions are being performed.

A carrier hopping pattern may be determined to have different patterns for each cell. This may be intended to reduce inter-cell interference.

II-3. Method for Transmitting a Periodic SRS of an NB-IoT

An NB-IoT device (or UE) may transmit an SRS periodically. To this purpose, a base station may deliver necessary information through higher layer signaling using an SIB or an RRC signal. The necessary information described above may include one or more of the information given below.

Period: A period for transmitting an SRS may be specified. At this time, the period may be defined as an interval between positions at which SRS transmission is started. If SRS transmission is impossible because the start position of SRS transmission specified by a period corresponds to an invalid subframe, SRS transmission may be given up on the corresponding UpPTS.

Time offset: Information of a time offset may be used for determining the position for transmitting an SRS for the first time. For example, the time offset may be determined so that the initial SRS transmission is performed after a configured time offset measured from the moment CDRX is completed. If SRS transmission is impossible because the start position of SRS transmission specified through the time offset corresponds to an invalid subframe, SRS transmission may be given up on the corresponding UpPTS. If the period information is applied, a period value may be applied after the SRS start position configured by the time offset.

Starting carrier: A carrier from which SRS transmission is started may be determined. After the starting carrier performs SRS transmission, a carrier to transmit the SRS may be selected according to a carrier hopping pattern. At this time, the starting carrier may be a carrier on which an NB-IoT device (or UE) camps. Similarly, the starting carrier may always be determined as an anchor carrier. Or the starting carrier may be a specific carrier configured through higher layer signaling.

Repetition: Transmission of an SRS may be repeated on one or more UpPTSs. This may be intended to obtain sufficient power required for SRS transmission.

II-4. Method for Transmitting an Aperiodic SRS of an NB-IoT Device

An NB-IoT device (or UE) may transmit an SRS aperiodically. To this end, a base station may deliver necessary common information to the NB-IoT device (or UE) through higher layer signaling using an SIB or an RRC signal, and part of individual information may be configured through DCI. If a periodic SRS is configured, part of the necessary common information above may be utilized for transmission of a periodic SRS. The necessary individual information described above may include one or more information defined in Section II-3.

II-5. Method for Determining Repetition According to the Number of Symbols Comprising UpPTS If the number of OFDM symbols available for an UpPTS is larger than 2, an NB-IoT device (or UE) may transmit an SRS repeatedly. At this time, the number of repetitions may be the same as the number of OFDM symbols available in the UpPTS.

When repetition is applied, OFDM symbols belonging to one UpPTS (or multiple UpPTSs) are regarded as belonging to one group, and a cover code in units of OFDM symbols may be applied. This may be intended for multiplexing a plurality of NB-IoT devices (or UEs) within the same cell or for reducing inter-cell interference. At this time, each NB-IoT device (or UE) may determine the cover code type to be used by itself based on its ID (namely UE ID) or information configured by the base station. The information may be configured through higher layer signaling using an SIB or an RRC signal; or configured dynamically through DCI when aperiodic SRS transmission is configured by the NPDCCH.

II-6. Method for Resolving Collision with Other Channel Having Different SRS Transmission Timing If an NB-IoT device (or UE) detects DCI corresponding to a downlink grant, an SRS may not be transmitted for a duration since an NPDSCH is received until ACK/NACK is transmitted in response thereto. Also, if an NB-IoT device (or UE) detects DCI corresponding to an uplink grant, an SRS may not be transmitted while NPUSCH transmission is performed. This may be intended to reduce time required for frequency retuning and power consumption.

A downlink SRS gap may be configured for a predetermined time period after transmission of an NPUSCH (data and/or ACK/NACK), which determines not to transmit an SRS. This may be intended to guarantee the case where reception of an NPDSCH or transmission of an NPUSCH is performed continuously through the next DCI.

When a resource for an NPRACH or a scheduling request is configured, an SRS may be determined not to be transmitted for the case of an UpPTS located right before the uplink subframe for which the corresponding resource is configured. This is intended to secure time for frequency retuning of an NB-IoT device (or UE).

II-7. Method for Specifying Subcarrier Allocation

In NB-IoT uplink transmission, uplink transmission using 1, 3, 6, and 12 subcarriers is possible. At this time, an NB-IoT device (or UE) may be capable of supporting only one carrier. Taking into account this feature, the present section may include a method for distinguishing SRS transmission using 1, 3, 6, and 12 subcarriers.

II-7-1. When SRS transmission using one or more subcarriers is allowed, SRS transmission methods corresponding to the respective numbers of subcarriers may differ from each other.

At this time, the size of a subcarrier which transmits an SRS may be different from each other in terms of SRS transmission units comprising the subcarrier in the time domain.

For example, when an SRS is transmitted using 1, 3, 6, and 12 subcarriers, X1, X2, X3, or X4 UpPTS regions may be used as one SRS unit, respectively.

When an SRS is transmitted by using one subcarrier, a sequence may be composed in X1 UpPTS regions of the time domain. This may be intended to identify different NB-IoT devices (or UEs) within the same cell or reduce inter-cell interference.

II-7-2. When an SRS is transmitted by using one or more subcarriers, SRS resources which transmits the SRS may be configured separately according to the number of subcarrier used.

At this time, one UpPTS symbol may be configured such that its resources on the frequency domain are distinguished in the FDM form to support SRS transmission using 1, 3, and 6 subcarriers.

At this time, a specific UpPTS may be used for supporting an SRS which uses a specific subcarrier number.

At this time, information about SRS resources used may be delivered to an NB-IoT device (or UE) through higher layer signaling using an SIB or an RRC signal according to the size of each subcarrier.

At this time, if SRS transmission is performed aperiodically using an NPDCCH, the number of subcarriers to be selected by the NB-IoT device (or UE) and information about SRS resources may be delivered dynamically through DCI.

III. Third Disclosure: RS Configuration for Special Subframe Configuration #10

According to the definition of frame structure type 2, the total number of special subframe configurations available for the TDD structure is 11. In particular, the special subframe configuration #10, which is a new structure introduced since the release-14, uses 6 OFDM symbols in the DwPTS region and 6 OFDM symbols in the UpPTS region as a new CP criterion. More specifically, the special subframe configuration #10 may determine whether to transmit a CRS to the fifth symbol position of the DwPTS region. If the base station supports the special subframe configuration #10 for which CRS-less DwPTS has been configured, legacy LTE UEs are unable to expect a CRS at the fifth OFDM symbol of the DwPTS region from the corresponding base station. A primary reason of the aforementioned structure is to minimize interference imposed on UL transmission by the DwPTS region.

In what follows, when the subframe configuration #10 is used for the NB-IoT TDD structure, RSs are used independently from each other. The methods proposed below may be used separately or in the form of a combination thereof. In what follows, unless described specifically, descriptions below are related to the methods for RS transmission with respect to the fifth OFDM symbol of the DwPTS region.

III-1. Method for Transmitting an RS to the Fifth Symbol of Special Subframe Configuration #10

The method proposed by the present section enables a base station to transmit an RS to the position of the fifth symbol of a DwPTS when the special subframe configuration #10 is configured and an NB-IoT device to receive and use the RS. In general, an RS may be used for the purposes of channel estimation and measurement and provide higher accuracy as the RS density becomes higher (namely the more the RSs become available).

Detailed descriptions of the proposed method may be as follows.

III-1-1. The proposed method may be applied when the operation mode of an NB-IoT is the in-band mode.

When the operation mode of an NB-IoT is the in-band same PCI mode, the RS transmitted may be a CRS.

At this time, the transmitted CRS may be determined to follow the CRS pattern and generation rule of the fifth OFDM symbol of a downlink subframe.

When the operation mode of an NB-IoT is in-ban different PCI (inband-DifferentPCI) mode, the RS transmitted may be an NRS.

At this time, the transmitted NRS may follow one of the patterns and generation rules among OFDM symbols (for example, the sixth and seventh symbols in a slot) including the NRS in the downlink subframe.

At this time, the pattern to be selected and the generation rule may be determined based on the sixth OFDM symbol when the index of a special subframe is an odd number and the seventh OFDM symbol when the index is an even number (or vice versa).

The reason for determining whether to transmit an RS according to the operation mode as described above is that when the operation mode is the guardband or standalone mode, there may be no influence by a CRS-less DwPTS. Also, when the operation mode is the in-band same PCI mode, an NB-IoT device, being aware of the information about the CRS pattern and the generation rule, may perform decoding by using the information. Also, the reason is that when the operation mode is the in-band same PCI mode, the NB-IoT device becomes able to transmit a CRS so that cross-subframe channel estimation or symbol-level combining may be applied easily. Also, when the operation mode is the inband-DifferentPCI mode, since an NB-IoT device does not know the CRS pattern and the generation rule, it regards the position of the CRS as an RE which is not used normally. However, if the CRS-less DwPTS is configured, it may be expected that an RS is not transmitted to the transmission position of the CRS at the fifth symbol of the DwPTS. Therefore, in this case, it may be determined that the position of the corresponding CRS is used for mapping of an NRS which may be recognized by an NB-IoT device.

III-1-2. The proposed method may be applied to the case where a DwPTS region is configured as a valid subframe.

If a specific DwPTS is invalid, an NB-IoT device does not expect an RS to be transmitted at the fifth OFDM symbol of the corresponding DwPTS.

The proposed method may be applied only for the case where actual data are transmitted to the DwPTS region.

The proposed method may be applied only for the case where an NRS is included in a different OFDM symbol other than the fifth OFDM symbol in the DwPTS region.

When an NB-IoT device does not know whether an NRS is included in a different OFDM symbol other than the fifth OFDM symbol in a specific DwPTS region, the corresponding NB-IoT device does not expect a CRS to be transmitted in the corresponding DwPTS region.

The reason why the proposed method allows RS transmission on a valid subframe is that when a base station declares the corresponding DwPTS region as valid, the corresponding DwPTS region may be regarded as being allowed to be used for the purpose of NB-IoT. Also, even when the base station declares a specific DwPTS as valid, if actual data or an NRS is not transmitted to the specific DwPTS, the base station may be regarded to intend to avoid interference due to uplink transmission by skipping transmission in the corresponding DwPTS.

III-1-3. The proposed method may be applied when transmission of an NPDSCH granted through an NPDCCH is scheduled so that transmission at a DwPTS may be performed.

At this time, the NPDCCH may be determined not to be transmitted through the DwPTS.

At this time, whether NPDSCH transmission is allowed at the DwPTS may be delivered to a UE through information included in the DCI obtained through the NPDCCH. For example, the information may include DCI bit, CRC masking value, and so on.

At this time, whether NPDSCH transmission is allowed at the DwPTS may be determined according to the transmission length of the NPDSCH delivered by the DCI.

The transmission length may refer to the repetition size of the NPDSCH, the number of downlink subframes required to map one TB to an RE, or a combination of both. More specifically, whether NPDSCH transmission is allowed at the DwPTS may be determined for the case where the transmission length is less than M subframes with respect to a specific constant M. Or whether NPDSCH transmission is allowed at the DwPTS may be determined for the case where the number of DwPTSs involved in transmission of the NPDSCH is less than N with respect to a specific constant N.

According to the method described above, an advantage is obtained that a base station may dynamically control transmission of the NPDSCH at the DwPTS depending on the situation. Also, when the number of DwPTSs used for transmission of the NPDSCH is small since the length of NPDSCH transmission is short, transmission of the corresponding NPDSCH exerts relatively little influence, and therefore, in this case, the transmission may be allowed.

III-1-4. The proposed method may be determined to be always applied for the anchor carrier.

At this time, transmission may be determined only by higher layer signaling.

In the case of an anchor carrier, since NPSS/NSSS is transmitted periodically, the number of subframes capable of transmitting an NRS may be relatively small compared with a non-anchor carrier. Also, the more subframes to which an CRS and an NRS are transmitted, the more advantageous to improve decoding performance of SIB1-NB. Also, since an anchor carrier may be regarded as a subframe allocated by the base station for NB-IoT, a probability that downlink/uplink transmission for other purposes occurs may be relatively low. Therefore, an in the proposed method, it may be advantageous to always expect an RS in the DwPTS region of the anchor carrier.

III-1-5. The proposed method may be applied when NPRACH transmission is started within K subframes after DwPTS.

At this time, the K value may be a predefined value.

The proposed method may be applied to a carrier capable of performing RRM measurement before a UE performs NPRACH.

The carrier may be determined as an anchor carrier.

The carrier may be determined as a carrier from which an NB-IoT device expects to receive the second message (Msg2) (namely, random access response) and/or fourth message (Msg4) of a random access procedure.

An NB-IoT device needs to know its CE level accurately Before performing the random access procedure (namely NPRACH). The NB-IoT device may perform RRM measurement using an RS to measure the CE level, and the proposed method may be intended to allow the UE to secure more RSs to estimate the CE level under such a situation.

III-2. Method for Not Transmitting an RS to the Fifth Symbol of Special Subframe Configuration #10

According to the proposed method in this section, a base station does not transmit an RS to the position of the fifth symbol of a DwPTS, which may be recognized by an NB-IoT; and the RS at the corresponding position may be made not to be used.

A specific example to which the proposed method is applied may be as follows.

III-2-1. When actual data transmission is performed in the DwPTS region, all of the REs of the fifth OFDM symbol of the corresponding DwPTS may be used for the purpose of data transmission.

In some cases, instead of increasing the density of RS, securing a sufficient number of REs for data and lowering the code rate may be more advantageous. Similarly, in terms of complexity of a UE, instead of applying an RS differently according to the situation, it may be more advantageous to always assume that an RS is not available.

The embodiments of the present invention described above may be implemented through various means. For example, embodiments of the present invention may be implemented by hardware, firmware, software, or a combination thereof. More specifically, implementation of the embodiments will be described with reference to related drawings.

Figure 13:
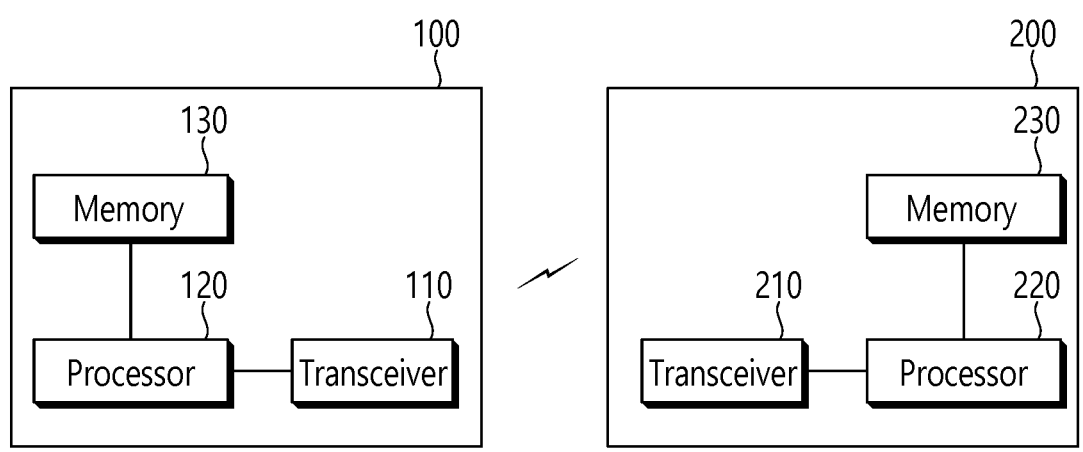
FIG. 13 illustrates a block diagram of a wireless device and a base station in which a disclosure of the present specification is implemented.

FIG. 13 illustrates a block diagram of a wireless device and a base station in which a disclosure of the present specification is implemented.

Referring to FIG. 13, a wireless device 100 and a base station 200 may implement the disclosure of the present specification.

The wireless device 100 in the figure comprises a processor 101, memory 102, and transceiver 103. In the same manner, the base station 200 comprises a processor 201, memory 202, and transceiver 203. The processor 101, 201, memory 102, 202, and transceiver 103, 203 may be implemented by the respective chips, or at least two or more blocks/functions may be implemented through one chip.

The transceiver 103, 203 includes a transmitter and a receiver. When a specific operation is performed, an operation of only one of the transmitter and the receiver may be performed, or both of the transmitter and receiver operations may be performed. The transceiver 103, 203 may include one or more antennas transmitting and/or receiving a radio signal. Also, the transceiver 103, 203 may include an amplifier for amplifying a reception signal and/or transmission signal; and a bandpass filter for transmission to a specific frequency band.

The processor 101, 201 may implement functions, processes and/or methods proposed by the present specification. The processor 101, 201 may include an encoder and a decoder. For example, the processor 101, 202 may perform an operation due to the methods described above. The processor 101, 201 may include application-specific integrated circuit (ASIC), other chipsets, logic circuits, data processing apparatus and/or converter which converts a baseband signal and a radio signal to each other.

The memory 102, 202 may include Read-Only Memory (ROM), Random Access Memory (RAM), flash memory, memory card, storage medium and/or other storage devices.

Figure 14:
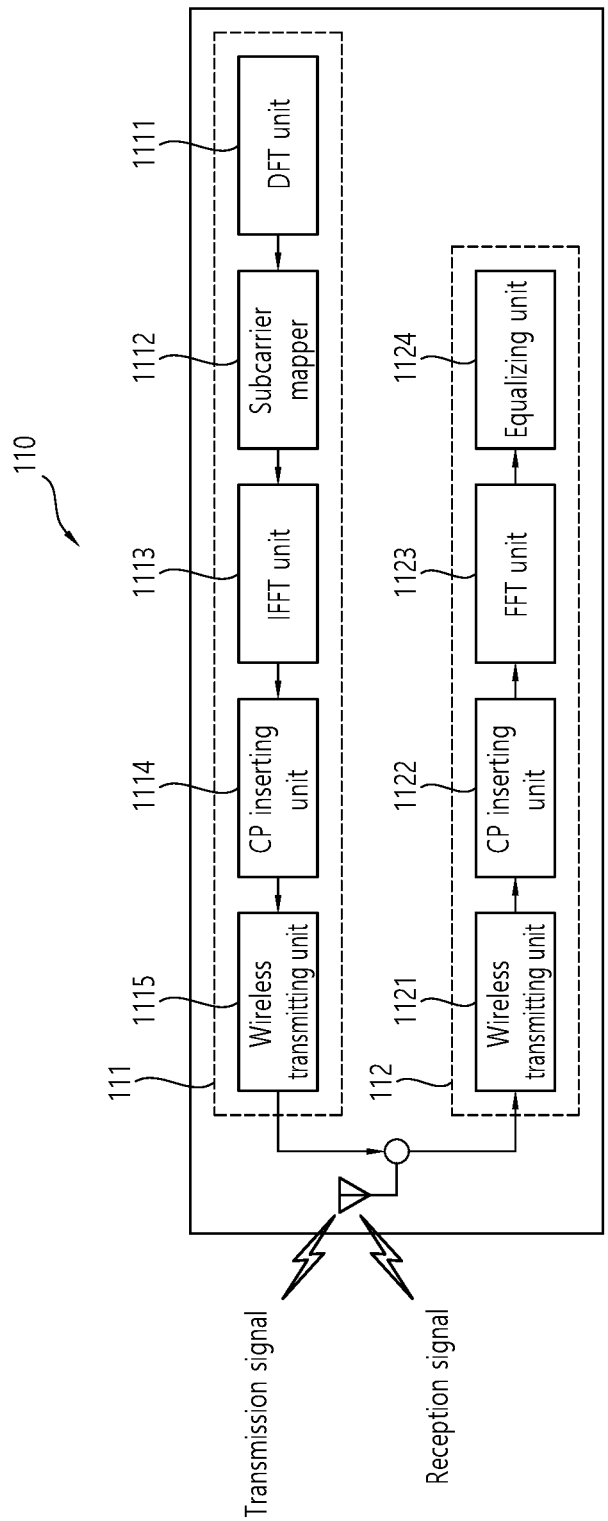
FIG. 14 is a detailed block diagram of a transceiver of a wireless device of FIG. 13.

FIG. 14 is a detailed block diagram of a transceiver of a wireless device of FIG. 13.

Referring to FIG. 14, a transceiver 110 comprises a transmitter 111 and a receiver 112. The transmitter 111 comprises a Discrete Fourier Transform (DFT) unit 1111, subcarrier mapper 1112, IFFT unit 1113, CP inserting unit 1114, and wireless transmitting unit 1115. The transmitter 111 may further comprise a modulator. Also, for example, the transmitter 111 may further comprise a scramble unit (not shown), modulation mapper (not shown), layer mapper (not shown), and layer permutator, which may be disposed in from of the DFT unit 1111. In other words, to prevent increase of peak-to-average power ratio (PAPR), the transmitter 111 first makes information go through the DFT 1111 before mapping a signal to a subcarrier. A signal spread (or precoded in the same context) by the DFT unit 1111 goes through subcarrier mapping through the subcarrier mapper 1112 and is converted again to a time-series signal through the Inverse Fast Fourier Transform (IFFT) unit 1113.

The DFT unit 1111 performs DFT on the input symbols to produce symbols of complex-number symbols. For example, if Ntx symbols are input (where Ntx is a natural number), its DFT size is Ntx. The DFT unit 1111 may be called a transform precoder. The subcarrier mapper 1112 maps the complex-number symbols to the respective subcarriers in the frequency domain. The complex-number symbols may be mapped to resource elements corresponding to a resource block allocated for data transmission. The subcarrier mapper 1112 may be called a resource element mapper. IFFT unit 1113 performs IFFT on the input symbols to produce a baseband signal for data, which is a signal in the time domain. The CP inserting unit 1114 copies part of the trailing portion of the baseband signal for data and inserts the part into the leading portion of the baseband signal for data. Through CP insertion, inter-symbol interference (ISI) and inter-carrier interference (ICI) may be prevented, and thus orthogonality may be maintained even for multi-path channels.

On the other hand, the receiver 112 may comprise a wireless receiving unit 1121, CP removing unit 1122, FFT unit 1123, and equalizing unit 1124. The wireless receiving unit 1121, CP removing unit 1122, and FFT unit 1123 of the receiver 112 perform the inverse roles of the wireless transmitting unit 1115, CP inserting unit 1114, and the IFFT unit 1113 of the transmitter 111. The receiver 112 may further comprise a demodulator.

What is claimed is:

1. A method of receiving a narrowband reference signal (NRS), the method performed by a narrowband internet of things (NB-IoT) device and comprising:
   determining information regarding a time division duplex (TDD) special subframe configuration, among a plurality of TDD special subframe configurations that each configures a plurality of downlink (DL) orthogonal frequency division multiplexing (OFDM) symbols and at least one uplink (UL) OFDM symbol within a TDD special subframe; and
   receiving the NRS on at least one DL OFDM symbol among the plurality of DL OFDM symbols within the TDD special subframe, wherein a symbol location of the at least one DL OFDM symbol for receiving the NRS is determined based on the TDD special subframe configuration.

2. The method of claim 1, wherein the TDD special subframe comprising the at least one DL OFDM symbol for receiving the NRS uses at least one of TDD special configuration indexes 1, 2, 3, 4, 6, 7, 8, or 9.

3. The method of claim 1, wherein the at least one DL OFDM symbol for receiving the NRS comprises at least one of a 6th symbol or a 7th symbol in the TDD special subframe.

4. The method of claim 1, wherein the NRS is not received on at least one TDD special subframe using TDD special configuration indexes 0 and 5.

5. The method of claim 1, wherein the at least one DL OFDM symbol for receiving the NRS comprises at least one of a 2nd symbol or a 3rd symbol in the TDD special subframe.

6. The method of claim 1, wherein the NRS on the TDD special subframe is generated based on a normal downlink subframe.

7. The method of claim 1, further comprising:
   receiving a second reference signal (RS) in a second TDD special subframe using a TDD special subframe configuration index 10.

8. The method of claim 7, wherein based on an NB-IoT operation mode being an inband-same PCI mode representing an inband-same physical cell identifier (PCI):
   the second RS comprises a cell-specific reference signal (CRS).

9. The method of claim 8, wherein based on the NB-IoT operation mode being the inband-same PCI representing the inband-same PCI:
   a location of a resource element (RE) to which the NRS is mapped is different from a location of a RE to which the CRS is mapped.

10. The method of claim 8, wherein based on a NB-IoT operation mode being an inband-different PCI mode representing an inband-different PCI:
    the second RS comprises an NRS.

11. The method of claim 10, wherein based on the NB-IoT operation mode being the inband-different PCI representing the inband-different PCI:
    an RE to which the CRS is to be mapped is used as a blank RE.

12. The method of claim 7, wherein the second TDD special subframe using the TDD special subframe configuration index 10 is designated as a valid subframe.

13. The method of claim 11, wherein the second TDD special subframe using the TDD special subframe configuration index 10 comprises a downlink pilot time slot (DwPTS) in which a downlink data is to be received.

14. The method of claim 1, wherein the TDD special subframe in which the NRS is received is a valid subframe in which a downlink data is to be received.

15. The method of claim 1, wherein for a first TDD special subframe configuration among the plurality of TDD special subframe configurations, the symbol location of the at least one DL OFDM symbol comprises a third symbol in the TDD special subframe, and wherein for a second TDD special subframe configuration among the plurality of TDD special subframe configurations, the symbol location of the at least one DL OFDM symbol comprises a sixth symbol in the TDD special subframe.

16. The method of claim 1, wherein the TDD special subframe configuration relates to a TDD special subframe that comprises a downlink pilot time slot (DwPTS), a guard period (GP), and an uplink pilot time slot (UpPTS).

17. The method of claim 1, wherein at least one of a number of DL OFDM symbols or a number of UL OFDM symbols is different for different TDD special subframe configurations among the plurality of TDD special subframe configurations.

18. A narrowband internet of things (NB-IoT) device configured to receive a narrowband reference signal (NRS), the NB-IoT device comprising:
a transceiver;
at least one processor; and
at least one computer memory operably connectable to the at least one processor and storing instructions that, when executed by the at least one processor, perform operations comprising:
determining information regarding a time division duplex (TDD) special subframe configuration, among a plurality of TDD special subframe configurations that each configures a plurality of downlink (DL) orthogonal frequency division multiplexing (OFDM) symbols and at least one uplink (UL) OFDM symbol within a TDD special subframe; and
receiving, via the transceiver, the NRS on at least one DL OFDM symbol among the plurality of DL OFDM symbols within the TDD special subframe,
wherein a symbol location of the at least one OFDM symbol for receiving the NRS is determined based on the TDD special subframe configuration.

19. The NB-IoT device of claim 18, wherein the TDD special subframe comprises at least three DL OFDM symbols for receiving the NRS, and uses at least one of TDD special configuration indexes 1, 2, 3, 4, 6, 7, 8, or 9.

* * * * *